(12) United States Patent
Kizu et al.

(10) Patent No.: US 7,746,437 B2
(45) Date of Patent: Jun. 29, 2010

(54) LIQUID CRYSTAL DISPLAY

(75) Inventors: Yuko Kizu, Yokohama (JP); Yukio Kizaki, Kawasaki (JP); Rei Hasegawa, Yokohama (JP); Hirofumi Wakemoto, Kanazawa (JP); Kenji Nakao, Kanazawa (JP); Tetsuya Kojima, Ishikawa-gun (JP); Tetsuo Fukami, Ishikawa-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 12/027,528

(22) Filed: Feb. 7, 2008

(65) Prior Publication Data

US 2008/0192194 A1    Aug. 14, 2008

(30) Foreign Application Priority Data

Feb. 9, 2007    (JP)    ............................. 2007-030839

(51) Int. Cl.
    *G02F 1/1343*    (2006.01)
(52) U.S. Cl. ........................................ 349/143; 349/146
(58) Field of Classification Search ........................ None
    See application file for complete search history.

(56) References Cited

U.S. PATENT DOCUMENTS

| | | | | |
|---|---|---|---|---|
| 5,940,056 | A |   | 8/1999 | Hanazawa et al. ............. 345/87 |
| 2002/0105613 | A1 | * | 8/2002 | Yamakita et al. ............. 349/143 |
| 2003/0122767 | A1 |   | 7/2003 | Nakao et al. .................. 345/96 |
| 2006/0114395 | A1 |   | 6/2006 | Kwon .......................... 349/139 |
| 2006/0203171 | A1 |   | 9/2006 | Ozawa ......................... 349/143 |
| 2007/0019120 | A1 |   | 1/2007 | Tasaka ......................... 349/38 |

FOREIGN PATENT DOCUMENTS

| | | | |
|---|---|---|---|
| JP | 2001-083552 |   | 3/2001 |
| JP | 2001-290127 |   | 10/2001 |
| JP | 2003-005189 |   | 1/2003 |
| JP | 2003-140194 | A * | 5/2003 |
| JP | 2003-295226 | A * | 10/2003 |
| JP | 2006-154797 |   | 6/2006 |

OTHER PUBLICATIONS

International Search Report and Written Opinion Corresponding to PCT Application No. PCT/JP2008/052599; Dated Jun. 2, 2008.
U.S. Appl. No. 11/313,925, filed Dec. 22, 2005.
Nakao, et al., "*High-Speed Bend Transition method Using Electrical Twist Field in OCB Mode TFT-LCD's*", Soc. Inf. Displ., 2004, pp. 1416-1419.

* cited by examiner

*Primary Examiner*—Mike Stahl
(74) *Attorney, Agent, or Firm*—Ohlandt, Greeley, Ruggiero & Perle, L.L.P.

(57) ABSTRACT

A liquid crystal display includes an insulating substrate, an alignment layer covering a main surface of the insulating substrate, and electrodes interposed therebetween. The alignment layer defines an alignment direction parallel to the main surface, an upstream side as one end's side of the alignment direction, and a downstream side as another end's side of the alignment direction, and tilts liquid crystal molecules toward the downstream side. Each electrode includes an upstream section that includes a first edge facing the upstream side and a downstream section that includes a second edge facing the downstream side and is provided with a recess recessed relative to the second edge. The first recess forms on the downstream section a third edge extending in the alignment direction and a fourth edge connecting the third edge to the second edge and facing the upstream side.

19 Claims, 19 Drawing Sheets

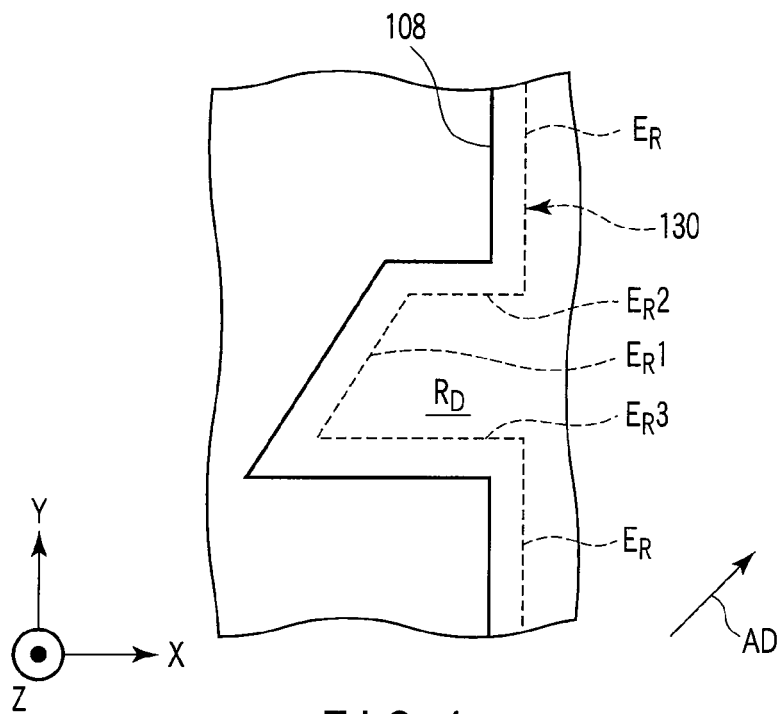
F I G. 4
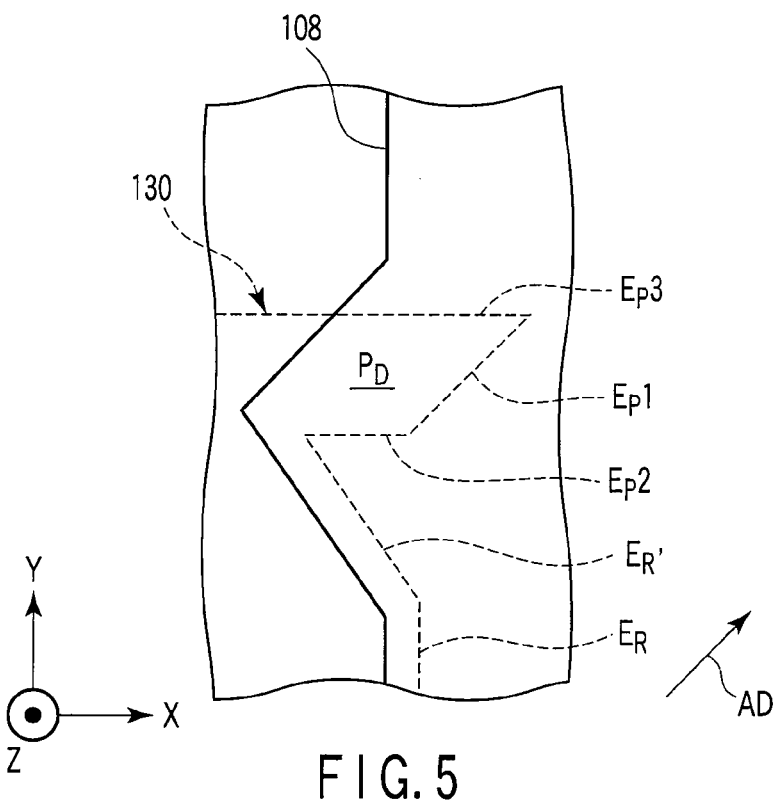
F I G. 5

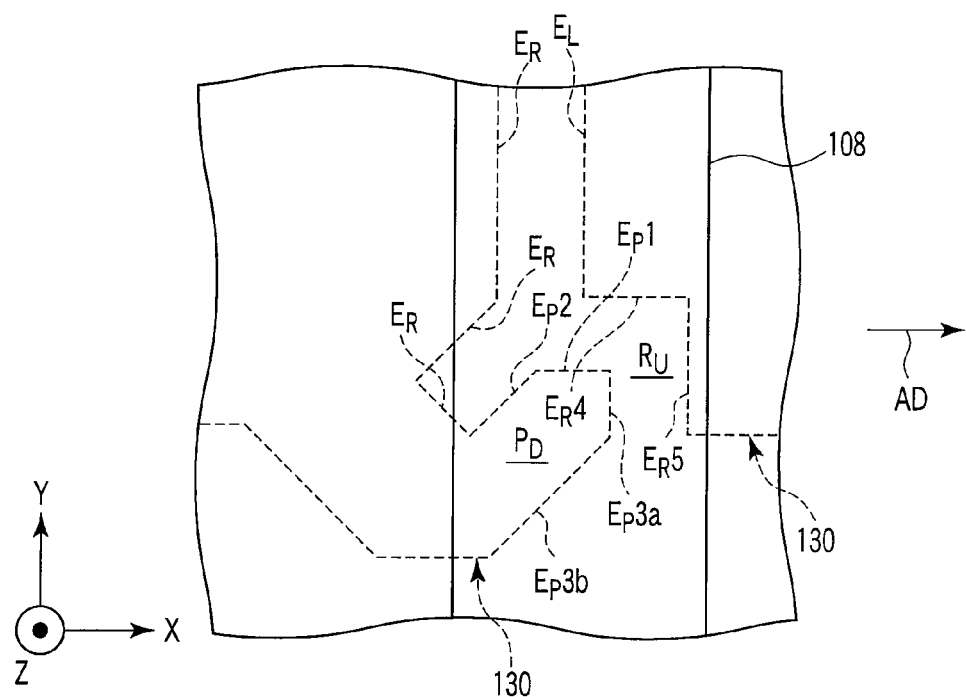
F I G. 13
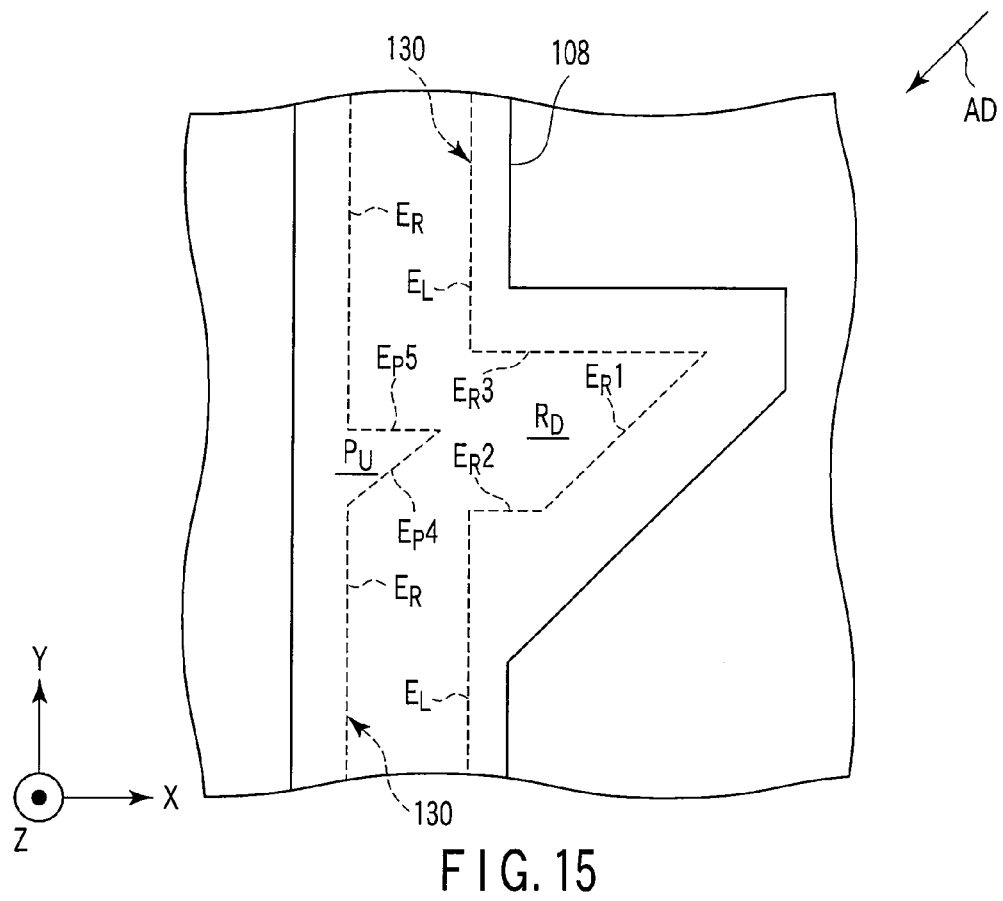
F I G. 15

LIQUID CRYSTAL DISPLAY

CROSS-REFERENCE TO RELATED APPLICATIONS

This application is based upon and claims the benefit of priority from prior Japanese Patent Application No. 2007-030839, filed Feb. 9, 2007, the entire contents of which are incorporated herein by reference.

BACKGROUND OF THE INVENTION

1. Field of the Invention

The present invention relates to a liquid crystal display.

2. Description of the Related Art

In a liquid crystal display using an optically compensated bend (OCB) mode, a liquid crystal material is caused to form a bend configuration, and the tilt angles of liquid crystal molecules are changed near each alignment layer, thereby changing the optical retardation of an optical filter layer. Because of utilizing the bend configuration, the OCB-mode is one of the display modes capable of realizing a high response speed and a wide viewing angle, and has attracted attention in recent years.

As described above, the bend configuration is essential in the OCB-mode. However, the bend configuration is difficult to stably obtain as will be explained below.

That is, a liquid crystal material of an OCB-mode liquid crystal display forms a splay configuration in an initial state in which the power supply is off. This is because the splay configuration is more stable than the bend configuration by nature. Therefore, a process for changing the splay configuration to the bend configuration is necessary when turning on the display.

In order to induce the transition, it is necessary to supply the liquid crystal material with energy higher than the difference in energies between the bend configuration and the splay configuration. Normally, the energy is supplied to the liquid crystal material by applying voltage to the liquid crystal cell. When the energy is almost equal to the difference of energies, the transition from the splay configuration to the bend configuration will proceed slowly. For this reason, the transition requires that a significantly high voltage be applied. Further, the transition process is prone to be affected by the shape of the substrate surface or the electric field distribution. Consequently, unchanged regions sometimes remain in the optical filter layer.

In order to solve this problem, JP-A 2001-83552 (KOKAI) describes that the pixel electrodes and/or the wirings are patterned into complex shapes so as to produce a non-uniform electric field. JP-A 2006-154797 (KOKAI) describes that the end faces of the pixel electrodes are inclined so as to produce a non-uniform electric field.

When such a technique is employed, under ordinary temperature conditions, the splay configuration can be rapidly changed to the bend configuration with an application of a relatively low voltage. However, the present inventors have found that the transition may not proceed in some regions of the optical filter layer at low temperatures near the lower limit of the temperature range within which the performance is guaranteed.

BRIEF SUMMARY OF THE INVENTION

According to a first aspect of the present invention, there is provided a liquid crystal display comprising a first substrate including a first insulating substrate with a first main surface, a first alignment layer covering the first main surface and defining an alignment direction parallel to the first main surface, an upstream side as one end's side of the alignment direction, and a downstream side as another end's side of the alignment direction, the first alignment layer tilting liquid crystal molecules toward the downstream side, and first electrodes interposed between the first insulating substrate and the first alignment layer and each comprising an upstream section that includes a first edge facing the upstream side and a downstream section that includes a second edge facing the downstream side and is provided with a first recess recessed relative to the second edge, the first recess forming on the downstream section a third edge extending in the alignment direction and a fourth edge connecting the third edge to the second edge and facing the upstream side, a second substrate including a second insulating substrate with a second main surface facing the first alignment layer, a second alignment layer covering the second main surface, and a second electrode interposed between the second insulating substrate and the second alignment layer, and an optical filter layer interposed between the first and second substrates and including liquid crystal molecules.

According to a second aspect of the present invention, there is provided a liquid crystal display comprising a first substrate including a first insulating substrate with a first main surface, a first alignment layer covering the first main surface and defining an alignment direction parallel to the first main surface, an upstream side as one end's side of the alignment direction, and a downstream side as another end's side of the alignment direction, the first alignment layer tilting liquid crystal molecules toward the downstream side, and first electrodes interposed between the first insulating substrate and the first alignment layer and each comprising an upstream section that includes a first edge facing the upstream side and a downstream section that includes a second edge facing the downstream side and a first protrusion protruding from the second edge toward the downstream side, the first protrusion forming on the downstream section a third edge extending in the alignment direction and a fourth edge connecting the third edge to the second edge and facing the upstream side, a second substrate including a second insulating substrate with a second main surface facing the first alignment layer, a second alignment layer covering the second main surface, and a second electrode interposed between the second insulating substrate and the second alignment layer, and an optical filter layer interposed between the first and second substrates and including liquid crystal molecules.

BRIEF DESCRIPTION OF THE SEVERAL VIEWS OF THE DRAWING

FIGS. 4 and 5 are enlarged plan views each showing a part of the liquid crystal display shown in FIGS. 1 to 3;

FIGS. 11 to 13 are enlarged plan views each showing a part of the liquid crystal display shown in FIG. 10;

FIG. 15 is an enlarged plan view showing a part of the liquid crystal display shown in FIG. 14;

DETAILED DESCRIPTION OF THE INVENTION

Figure 1:
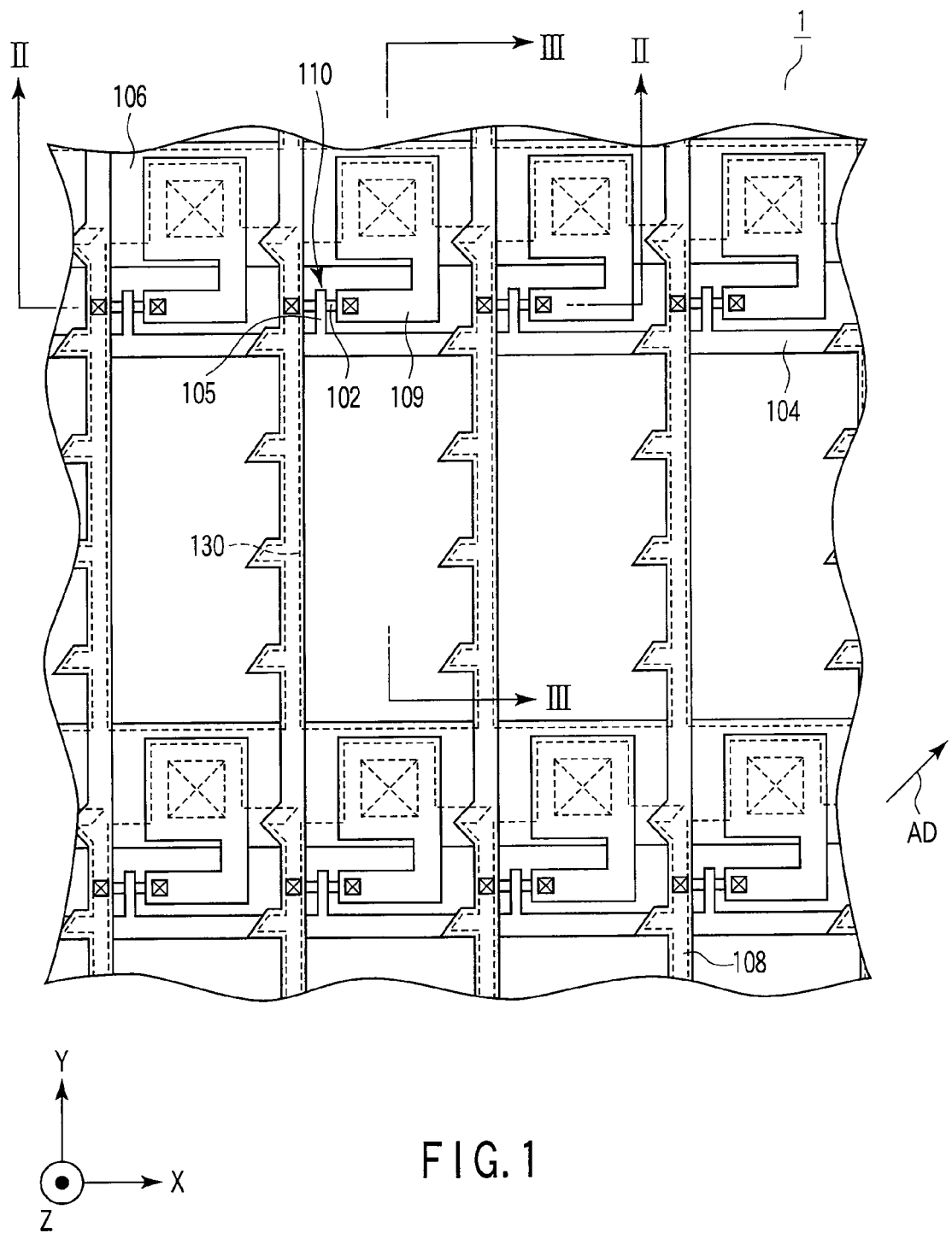
FIG. 1 is a plan view schematically showing a liquid crystal display according to a first embodiment.

Embodiments of the present invention will be described in detail below with reference to the accompanying drawings. Note that the same reference numerals denote components that achieve the same or similar functions in the drawings, and repetitive explanation thereof will be omitted.

Figure 2:
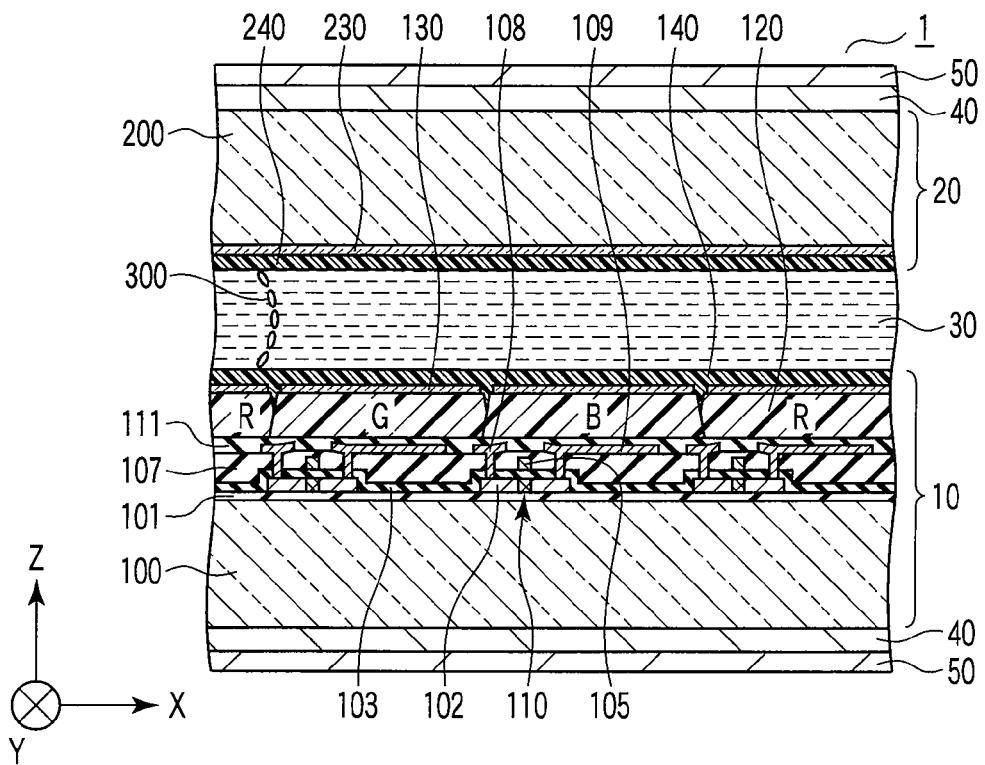
FIG. 2 is a sectional view taken along a line II-II of the liquid crystal display shown in FIG. 1.
Figure 3:
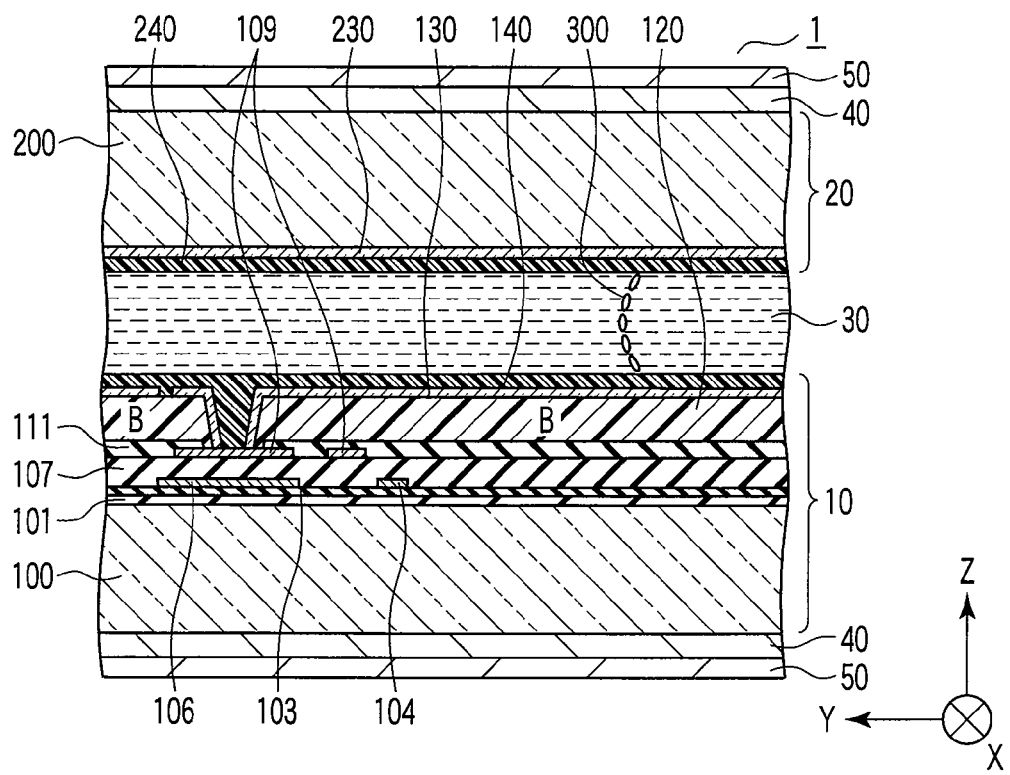
FIG. 3 is a sectional view taken along a line III-III of the liquid crystal display shown in FIG. 1.

The liquid crystal display shown in FIGS. 1 to 3 is an OCB-mode active matrix liquid crystal display. Note that the color filter to be described later is omitted in FIG. 1.

The liquid crystal display includes a liquid crystal display panel 1 and a backlight (not shown) that faces the liquid crystal display panel 1.

As shown in FIGS. 2 and 3, the liquid crystal display panel 1 includes a back substrate 10 as an array substrate, and a front substrate 20 as a counter substrate. A frame-like adhesive layer (not shown) is interposed between the back substrate 10 and the front substrate 20. A space surrounded by the back substrate 10, the front substrate 20, and the adhesive layer is filled with a liquid crystal material that forms an optical filter layer 30. An optical compensation film 40 and polarizer 50 are sequentially arranged on each of the outer surfaces of the back substrate 10 and the front substrate 20.

The back substrate 10 includes a transparent substrate 100 such as a glass substrate.

On the transparent substrate 100, an undercoat layer 101 such as an $SiN_x$ layer and/or an $SiO_2$ layer is formed.

On the undercoat layer 101, semiconductor layers 102 such as polysilicon layers each including source and drain are arranged.

The semiconductor layers 102 and undercoat layer 101 are covered with a gate insulator 103. The gate insulator 103 can be formed from, e.g., tetraethoxy orthosilane (TEOS).

On the gate insulator 103, scan signal lines 104 shown in FIGS. 1 and 3, gate electrodes 105 shown in FIGS. 1 and 2, and reference lines 106 shown in FIGS. 1 and 3 are arranged.

The scan signal lines 104 run in a first direction, and are arranged in a second direction crossing the first direction. Referring to FIG. 1, the scan signal lines 104 run in an X-direction that is the lateral or row direction, and are arranged in a Y-direction that is the longitudinal or column direction. A metal material can be used as the material of the scan signal lines 104. For example, MoW can be used as the material of the scan signal lines 104.

As shown in FIG. 1, the gate electrode 105 is formed as a part of the scan signal line 104. Also, as shown in FIG. 2, the gate electrode 105 faces a channel formed in the semiconductor layer 102 via the gate insulator 103. The gate electrode 105, the gate insulator 103, and the semiconductor layer 102 form a thin film transistor as a switching element 110 positioned near the intersection of the scan signal line 104 and a video signal line 108 (to be described later). Although the switching element 110 is a thin film transistor in this embodiment, another element such as a diode or a metal-insulator-metal (MIM) element may be used.

The reference lines 106 run in the X-direction, and are arranged in the Y-direction crossing the X-direction. In this embodiment, one reference line 106 is formed for each scan signal line. The reference lines 106 can be formed in, e.g., the same step as the scan signal lines 104.

As shown in FIGS. 2 and 3, the gate insulator 103, the scan signal lines 104, the gate electrodes 105, and the reference lines 106 are covered with an interlayer dielectric film 107. $SiO_2$ and/or $SiN_x$, for example, can be used as the material of the interlayer dielectric film 107.

As shown in FIGS. 1 and 2, video signal lines 108 and source electrodes 109 are arranged on the interlayer dielectric film 107.

The video signal lines 108 run in the second direction and are arranged in the first direction. Referring to FIG. 1, the video signal lines 108 run in the Y-direction and are arranged in the X-direction. A metal material can be used as the material of the video signal lines 108. For example, a three-layered structure including a Mo layer, an Al—Nd layer, and a Mo layer can be used as the video signal lines 108.

In this embodiment, a thin film transistor is used as the switching element 110, and, as shown in FIG. 2, the video signal line 108 is connected to the drain of the thin film transistor 110 via a through hole formed in the interlayer dielectric film 107. That is, in this embodiment, the video signal line 108 also serves as a drain electrode.

As shown in FIGS. 1 and 2, one end of the source electrode 109 is connected to the source of the thin film transistor 110 via a through hole formed in the interlayer dielectric film 107. Also, as shown in FIGS. 1 and 3, the other end of the source electrode 109 faces the reference line 106 via the interlayer dielectric film 107. That is, in this embodiment, the source electrode 109, the reference line 106, and the interlayer dielectric film 107 form a capacitor (or condenser). For example, the same material as the video signal line 108 can be used for the source electrode 109.

The interlayer dielectric film 107, the video signal lines 108, and the source electrodes 109 are covered with an insulating underlayer. Although the insulating underlayer includes a passivation layer 111 and a color filter 120 in this embodiment, the passivation layer 111 may be omitted.

As shown in FIGS. 2 and 3, the passivation layer 111 covers the interlayer dielectric film 107, video signal lines 108, and source electrodes 109. It is possible to use, e.g., $SiN_x$ layer as the material of the passivation layer 111.

A color filter 120 includes a plurality of coloring layers different in absorption spectrums, e.g., a green coloring layer G, a blue coloring layer B, and a red coloring layer R. In this embodiment, the coloring layers G, B, and R have band-like shapes that run in the Y-direction as shown in FIG. 3, and are arranged in the X-direction as shown in FIG. 2, thereby forming a stripe pattern. Also, in this embodiment as shown in FIG. 2, the coloring layers G, B, and R are formed such that their boundaries are positioned on the video signal lines 108. As the materials of the coloring layers G, B, and R, it is possible to use, e.g., mixtures of a transparent resin and a dye and/or a pigment. Although the color filter 120 is formed on the back substrate 10 in this embodiment, it may be formed on the front substrate 20.

On the color filter 120, as shown in FIGS. 1 to 3, pixel electrodes 130 made of a transparent conductor such as indium tin oxide (ITO) are arranged correspondently with the thin film transistors 110. As shown in FIGS. 1 and 3, the pixel electrodes 130 are connected to the source electrodes 109 via through holes formed in the passivation layer 111 and the color filter 120. The peripheries of the pixel electrodes face the wirings such as the reference lines 106 and the video signal lines 108. In this case, penetration of light can be prevented. The structures of the pixel electrodes 130 will be described later in detail.

The pixel electrodes 130 and color filter 120 are covered with an alignment layer 140. The alignment layer 140 defines an alignment direction and upstream and downstream sides. The alignment direction is the direction parallel to the main surface of the substrate 100 that faces the alignment layer 140. In FIG. 1, the alignment direction is shown as an arrow AD. The upstream side is one end's side of the alignment direction, while the downstream side is the other end's side of the alignment direction. In FIG. 1, the upstream side is the back end's side of the arrow AD, while the downstream side is the front end's side of the arrow AD. That is, in FIG. 1, the upstream side is the side on diagonally downward left, while the downstream side is the side on diagonally upward right.

The alignment layer 140 tilts liquid crystal molecules 300 in the vicinity thereof toward the downstream side. That is, the alignment layer 140 makes the liquid crystal material form a tilt configuration along the alignment direction AD.

The alignment layer 140 is, for example, a resin layer on which alignment process such as rubbing process is performed. As the material of the alignment layer 140, polyimide can be used, for example. When the rubbing process is employed as the alignment process, the side from which the rubbing process is started is the upstream side, while the side at which the rubbing process is ended is the downstream side. Also, in this case, the alignment direction AD is the rubbing direction.

The alignment layer 140 may be a silicon oxide layer formed by oblique evaporation. Alternatively, the alignment layer 140 may be a layer having a surface provided with an array of fine slopes. Alternatively, the alignment layer 140 may be the one that can be obtained by obliquely irradiating a layer of photo alignment resin with ultraviolet light.

As shown in FIGS. 2 and 3, the front substrate 20 includes a transparent substrate 200 such as a glass substrate. The substrate 200 faces the surface, on which the alignment layer 140 is formed, of the back substrate 10.

A common electrode 230 is formed on the surface of the substrate 200 that faces the back substrate 10. A transparent conductor such as ITO, for example, can be used as the material of the common electrode 230.

The common electrode 230 is covered with an alignment layer 240. The alignment layer 240 is spaced apart from those portions of the alignment layer 140 that are positioned on the pixel electrodes 130 by a spacer (not shown).

Similar to the alignment layer 140, the alignment layer 240 defines an alignment direction and upstream and downstream sides. In this embodiment, the alignment direction and the upstream and downstream sides defined by the alignment layer 240 are the same as the alignment direction and the upstream and downstream sides defined by the alignment layer 140, respectively.

The alignment layer 240 tilts liquid crystal molecules 300 in the vicinity thereof toward the downstream side. That is, the alignment layer 240 makes the liquid crystal material form a tilt configuration along the alignment direction AD. As the alignment layer 240, the same layers as those described for the alignment layer 140 can be used, for example.

A frame-like adhesive layer (not shown) is interposed between the back substrate 10 and front substrate 20. In addition, granular spacers (not shown) are located between the back substrate 10 and front substrate 20 and inside the frame formed by the adhesive layer. Alternatively, columnar spacers may be formed on at least one of the opposed surfaces of the back substrate 10 and front substrate 20. These spacers keep the thickness of the space surrounded by the back substrate 10, front substrate 20, and adhesive layer constant.

The optical filter layer 30 contains a liquid crystal material having positive dielectric anisotropy and positive refractive index anisotropy. This liquid crystal material forms a bend configuration while a voltage is applied between the pixel electrodes 130 and common electrode 230. Bright display and dark display are switched by changing, between a first value that is typically larger than zero and a second value that is larger than the first value, the absolute value of a voltage to be applied between the pixel electrodes 130 and common electrode 230. Note that in this embodiment, the first value may be zero in some cases. In the following description, a state in which the absolute value of the applied voltage is the first value will be referred to as an off state, and a state in which the absolute value of the applied voltage is the second value will be referred to as an on state.

FIGS. 2 and 3 show liquid crystal molecules 300 forming the bend configuration in the off state. The tilt angles of the liquid crystal molecules near the alignment layers 140 and 240 in the on state are larger than those in the off state.

The optical compensation films 40 are, e.g., biaxial films. Each optical compensation film 40 includes an optically anisotropic layer in which a uniaxial compound having negative refractive index anisotropy, e.g., a discotic liquid crystal compound forms a hybrid configuration.

For example, in the optical compensation film 40 covering the substrate 100, the optic axis of the uniaxial compound positioned near the back substrate 10 is substantially parallel to the optic axis of the liquid crystal molecules 300 that are in the on state and positioned near the back substrate 10. The optic axis of the uniaxial compound positioned far from the back substrate 10 is substantially parallel to the optic axis of the liquid crystal molecules 300 that are in the on state and positioned in the middle between the back substrate 10 and front substrate 20. In this case, in the optical compensation film 40 covering the substrate 200, the optic axis of the uniaxial compound positioned near the front substrate 20 may be substantially parallel to the optic axis of the liquid crystal molecules 300 that are in the on state and positioned near the front substrate 20, and the optic axis of the uniaxial compound positioned far from the front substrate 20 may be substantially parallel to the optic axis of the liquid crystal molecules 300 that are in the on state and positioned in the middle between the back substrate 10 and front substrate 20. The sum of the optical retardations of the optical compensation films 40 may be substantially equal to the optical retardation in the on state of the optical filter layer 30.

The polarizers 50 may be arranged such that their transmission axes are substantially perpendicular to each other. In addition, each polarizer 50 may be placed such that its transmission axis makes an angle of about 45° with each of the X-direction and Y-direction.

The backlight (not shown) illuminates the back substrate 10 of the liquid crystal display panel 1.

Note that in this embodiment, the liquid crystal display 1 has the structure that makes it possible to display an image in normally white mode. Alternatively, the liquid crystal display 1 may have the structure that makes it possible to display an image in normally black mode. Note also that this embodiment employs the arrangement that compensates for the on state, but the arrangement that compensates for the off state may also be employed.

Next, the pixel electrodes 130 are described with reference to FIGS. 1, 4 and 5.

As shown in FIG. 1, in the liquid crystal display, each pixel electrode 130 has a shape similar to rectangular. Each pixel electrode 130 includes an upstream section and a downstream section. The upstream section includes an edge facing the upstream side. In FIG. 1, among the edges of the pixel electrode 130, the edge on the bottom side and the edge on the left side face the upstream side. On the other hand, the downstream section includes an edge facing the downstream side. In FIG. 1, among the edges of the pixel electrode 130, the edge on the top side and the edge on the right side face the downstream side.

As shown in FIGS. 1 and 4, the downstream section of the pixel electrode 130 is provided with recesses $R_D$ recessed relative to the edge $E_R$ on the right side. Each recess $R_D$ forms on the downstream section an edge $E_R1$ extending in the alignment direction AD, an edge $E_R2$ connecting the edge $E_R1$ to the edge $E_R$ and facing the upstream side, and an edge $E_R3$ connecting the edge $E_R1$ to the edge $E_R$ and facing the downstream side.

As shown in FIGS. 1 and 5, the downstream section of the pixel electrode 130 is further provided with protrusions $P_D$ protruding from the edge $E_R$ on the right side toward the downstream side. Note that the reference symbol $E_R'$ refers to a bend portion of the edge $E_R$. Each protrusion $P_D$ forms on the downstream section an edge $E_P1$ extending in the alignment direction AD, an edge $E_P2$ connecting the edge $E_P1$ to the edge $E_R$ and facing the upstream side, and an edge $E_P3$ connecting the edge $E_P1$ to the edge $E_R$ and facing the downstream side.

When such a structure is employed, it is possible even at low temperatures to make it less prone to occur that the regions of the optical filter layer 30 in which the transition does not proceed are produced. This will be described with reference to FIGS. 6 to 9.

Figure 6:
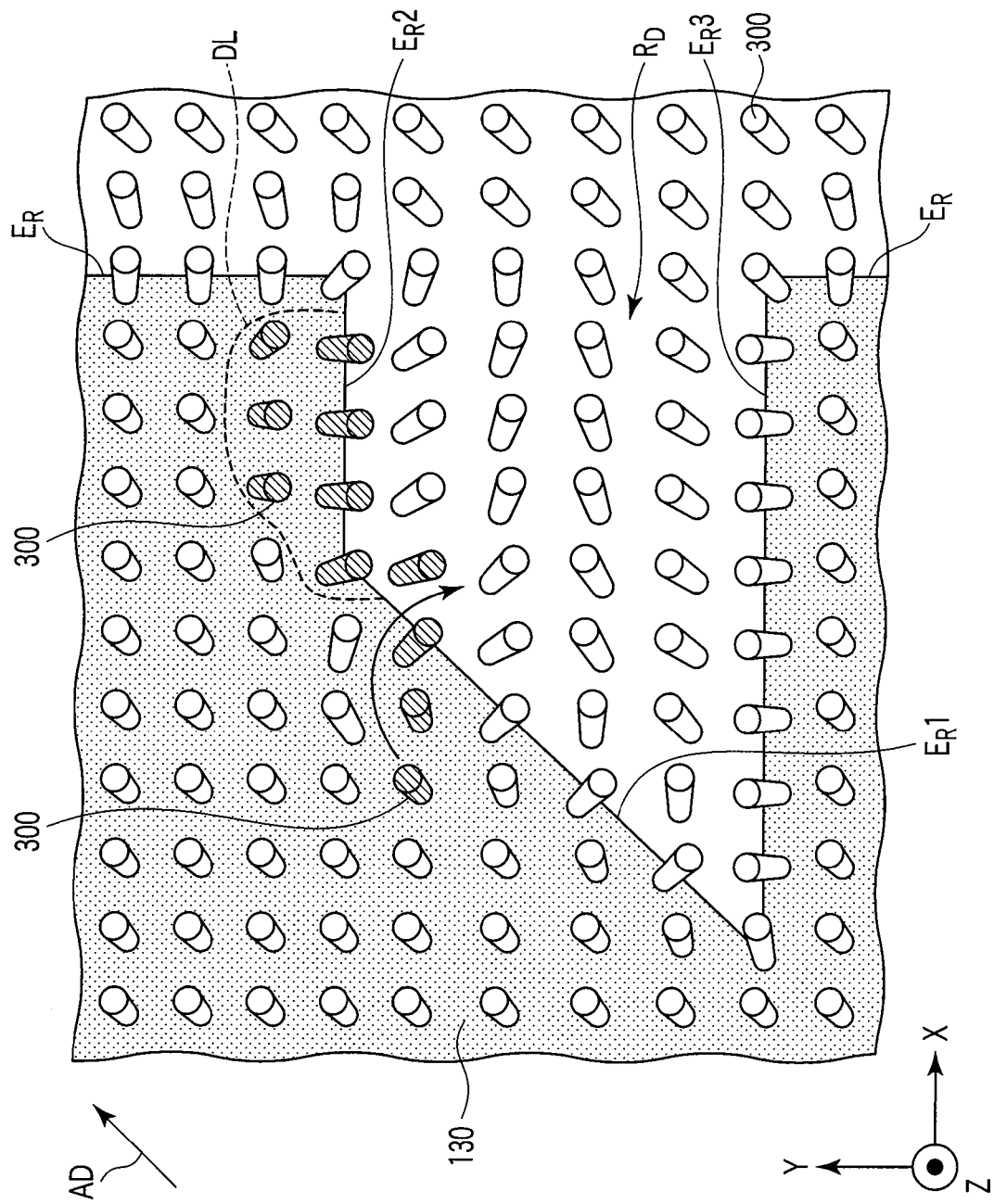
FIGS. 6 and 7 are plan views each schematically showing an example of the initial transition that occurs in the liquid crystal display shown in FIGS. 1 to 3.
Figure 7:
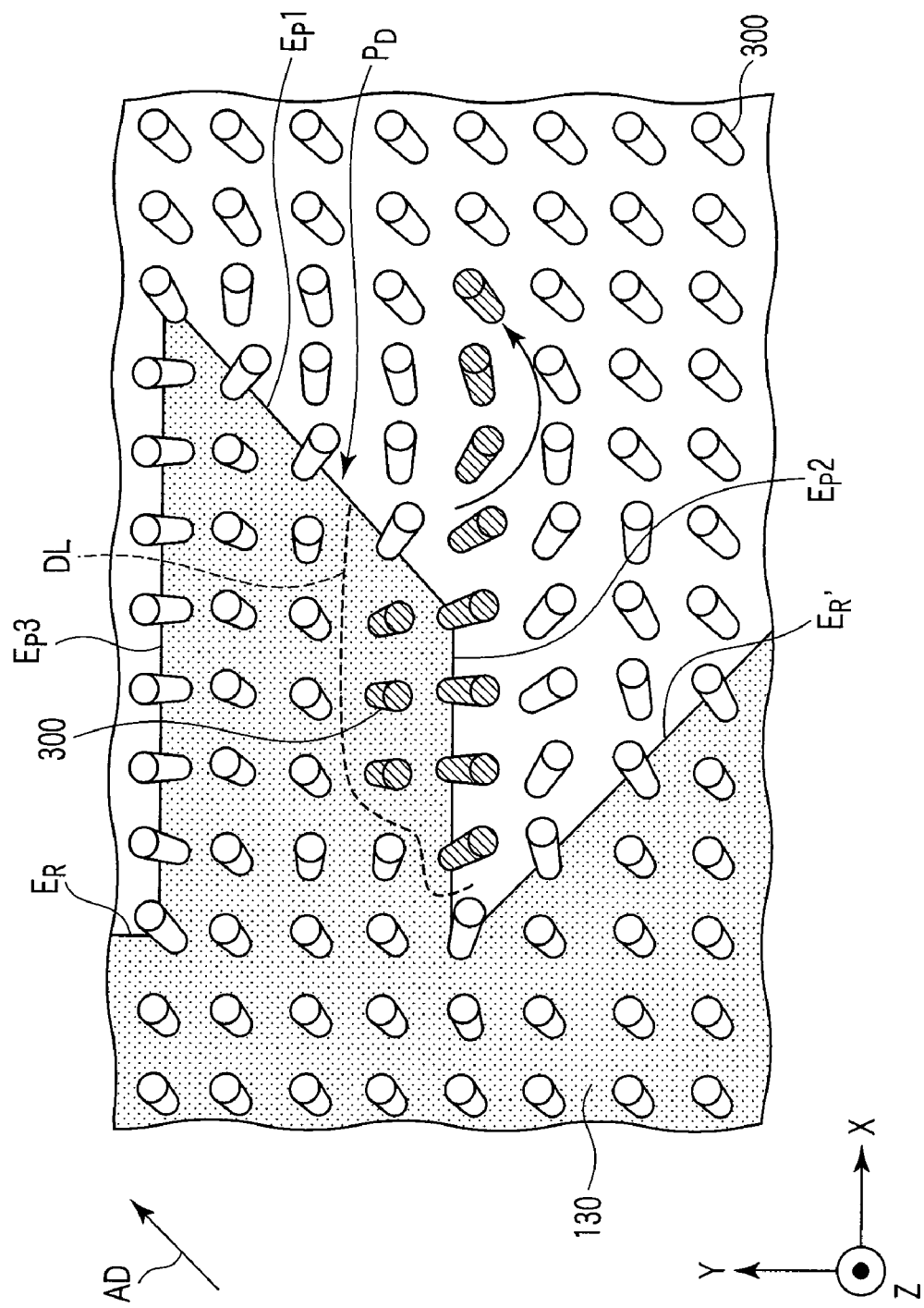

The structures shown in FIGS. 6 and 7 are almost the same as the structures shown in FIGS. 4 and 5, respectively. In FIGS. 6 to 9, the state in which a voltage is applied between the pixel electrode 130 and the common electrode 230 is shown. Also, in FIGS. 6 to 9, among the liquid crystal molecules 300, those in the vicinity of the alignment layer 140, in other words, in the vicinity of the pixel electrode 130 are depicted.

In the region of the optical filter layer 30 that corresponds to the center of the pixel electrode 130, the lines of electric force are perpendicular to the main surface of the substrate 100. Thus, the electric field induces the liquid crystal molecules 300 to align perpendicular to the main surface of the substrate 100. In other words, the electric field induces the liquid crystal molecules 300 to align such that their long axes or the axes of the molecules are perpendicular to the main surface of the substrate 100. On the other hand, the alignment layer 140 induces the liquid crystal molecules 300 to be tilted toward the downstream side as described above. Consequently, in this region, the liquid crystal molecules 300 in the vicinity of the alignment layer 140 are slightly tilted toward the downstream side.

In another region of the optical filter layer 30, the lines of electric force are bended. Each of the lines of electric force is bended in the plane that is perpendicular to the edge of the pixel electrode 130. In addition, the lines of electric force are inclined toward outside of the pixel electrode 130. Thus, in this region, the electric field induces the liquid crystal molecules 300 in the vicinity of the alignment layer 140 to be tilted in the plane almost perpendicular to the edge of the pixel electrode 130 toward the region between the adjacent pixel electrodes 130. Also, in this region, the alignment layer 140 induces the liquid crystal molecules 300 to be tilted toward the downstream side.

The influence of alignment layer 140 on the alignment of the liquid crystal molecules is almost constant. In contrast, the magnitude and direction of the force that the electric field acts on the liquid crystal molecules 300 vary in accordance with positions. Thus, among the liquid crystal molecules 300 in the vicinity of the alignment layer 140, those spaced apart from the pixel electrode 130 by a sufficient distance are greatly tilted toward the downstream side because the influence of the electric field is small. On the other hand, near the pixel electrode 130, the liquid crystal molecules 300 in the vicinity of the alignment layer 140 are tilted in the plane almost perpendicular to the edge of the pixel electrode 130 toward the region between the adjacent pixel electrodes 130.

As a result, in the optical filter layer 30, the regions different in the directions of the liquid crystal molecules 300 are arranged adjacent to one another in the vicinity of the alignment layer 140. The larger the difference in the directions of the liquid crystal molecules 300 between the adjacent regions, the higher the energy of their boundary portion becomes.

When the energy is nonuniform in the optical filter layer 30, the transition from the splay configuration to the bend configuration starts at the region having the highest energy. The higher the energy is, more readily the transition from the splay configuration to the bend configuration occurs.

Figure 8:
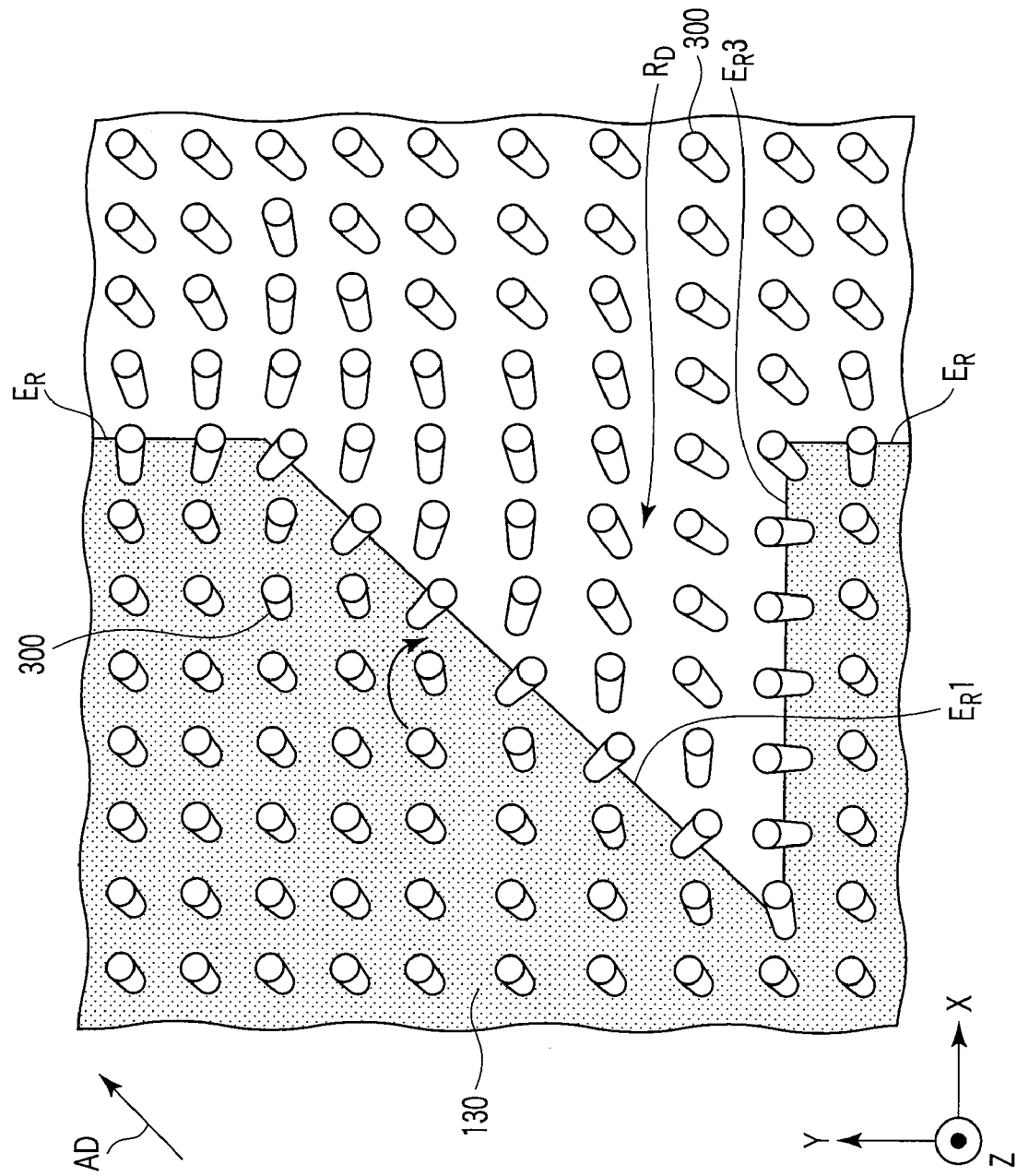
FIG. 8 is a plan view schematically showing the initial transition that occurs in a liquid crystal display according to a comparative example.

Comparing the structure shown in FIG. 6 and the structure shown in FIG. 8, these structures are the same in the sense that the pixel electrode 130 includes the edges $E_R1$, $E_R3$ and $E_R$.

As described above, above the center of the pixel electrode 130, the liquid crystal molecules 300 are slightly tilted toward the downstream side. In addition, since the edge $E_R1$ is parallel to the alignment direction AD, it induces the liquid crystal molecules 300 in the vicinity thereof to be tilted in the plane almost perpendicular to the edge of the pixel electrode 130 toward the region between the adjacent pixel electrodes 130. As a result, in the vicinity of the edge $E_R1$, a twisted configuration in which the orientations of the liquid crystal molecules 300 are changed clockwisely along the X-direction is formed. However, when the structure shown in FIG. 8 is employed, the twist angle is 90° at the maximum.

The structure shown in FIG. 6 differs from the structure shown in FIG. 8 in the sense that the pixel electrode 130 includes the edge $E_R2$. The electric field that the edge $E_R2$ forms makes the twist angle larger in the vicinity of the edge $E_R1$. Accordingly, when the structure shown in FIG. 6 is employed, it is possible to produce a twisted configuration having a twist angle over 90° in the vicinity of the edges $E_R1$ and $E_R2$.

When a twisted configuration having a twist angle over 90° is produced in a small region, the strain of the liquid crystal alignment greatly increases the energy in the region. In addition, the twisted configuration is similar to the 180°-twisted configuration that readily changes to the bend configuration. Therefore, when the structure shown in FIG. 6 is employed, the transition from the splay configuration to the bend configuration occurs more readily as compared with the case where the structure shown in FIG. 8 is employed.

Moreover, when the structure shown in FIG. 6 is employed, it is possible to make the inclinations of the liquid crystal molecules 300 in the plane perpendicular to the edge $E_R2$ greatly different between the region in the vicinity of the edge $E_R2$ and the adjacent region above the pixel electrode 130. This makes it possible to produce a disclination line DL near the edge $E_R2$.

The energies of the disclination line DL and the region in the vicinity thereof are high, although they may be lower than that of the region in which the above-described twisted configuration is produced. In addition, the disclination line DL and the region in the vicinity thereof are much larger than the region in which the above-described twisted configuration is produced. Further, the regions are adjacent to each other.

Accordingly, when the structure shown in FIG. 6 is employed, once the transition to the bend configuration starts in the region where the twisted configuration is produced, the region of the bend configuration readily grows to the disclination line DL and the region in the vicinity thereof. Therefore, when the structure shown in FIG. 6 is employed, the transition from the splay configuration to the bend configuration in the region of the optical filter layer 30 that corresponds to the downstream section of the pixel electrode 130 occurs far more readily as compared with the case where the structure shown in FIG. 8 is employed.

Figure 9:
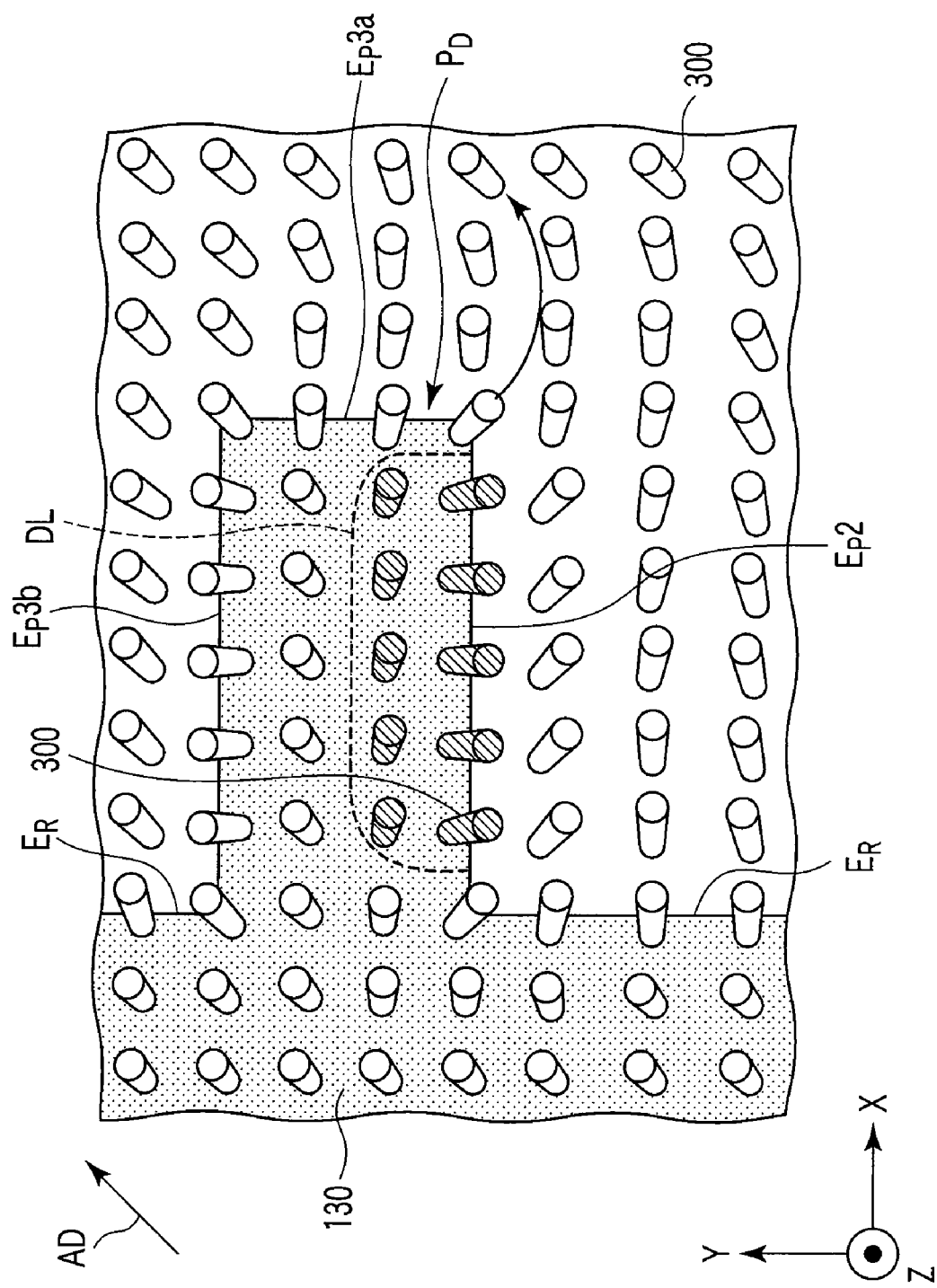
FIG. 9 is a plan view schematically showing the initial transition that occurs in a liquid crystal display according to another comparative example.

Next, the structure shown in FIG. 7 and the structure shown in FIG. 9 are compared.

When these structures are employed, a counterclockwisely twisted configuration is formed in the vicinity of the edge $E_P2$ in either case. The twist angle of the twisted configuration is about 90°, for example.

As described above, above the center of the pixel electrode 130, the liquid crystal molecules are slightly tilted toward the downstream side. Since the edge $E_P3a$ faces the downstream side in the structure shown in FIG. 9, the electric field that the edge $E_P3a$ forms does not greatly change the orientations of the liquid crystal molecules 300. Accordingly, when the structure shown in FIG. 9 is employed, although a clockwisely twisted configuration is formed in the vicinity of the edge $E_P3a$, the twist angle thereof is less than 90° in almost whole the region and is about 90° only near the corner connecting it to the edge $E_P2$. Also, although a counterclockwisely twisted configuration that extends outwardly from the electrode in the X-direction is formed, the same is applied to the twist angle thereof.

On the other hand, in the structure shown in FIG. 7, the edge $E_P1$ is parallel to the alignment direction AD. Accordingly, when the structure shown in FIG. 7 is employed, the twist angle of the clockwisely twisted configuration formed in the vicinity of the edge $E_P1$ exceeds 90° in the portion near the edge $E_P2$ and is about 90° in other portions. In this case, the counterclockwisely twisted configuration that extends outwardly from the electrode in the X-direction is formed, and the same is applied to the twist angle thereof.

Thus, when the structure shown in FIG. 7 is employed, not only the twisted configuration with the twist angle of about 90° can be formed over a large region, but also the twisted configuration with the twist angle over 90° can be formed.

Therefore when the structure shown in FIG. 9 is employed, although the transition from the splay configuration to the bend configuration may start in the vicinity of the corner, the behavior is unstable. In contrast, when the structure shown in FIG. 7 is employed, the transition from the splay configuration to the bend configuration can be started more stably.

Moreover, when the structure shown in FIG. 7 is employed, the disclination line DL can be produced near the edge $E_P2$. The energies of the disclination line DL and the region in the vicinity thereof are high, although they may be lower than that of the region in which the above-described twisted configuration is produced. In addition, the disclination line DL and the region in the vicinity thereof are much larger than the region in which the above-described twisted configuration is produced. Further, the regions are adjacent to each other.

Accordingly, when the structure shown in FIG. 7 is employed, once the transition to the bend configuration starts in the region where the twisted configuration is produced, the region of the bend configuration readily grows to the disclination line DL and the region in the vicinity thereof. Therefore, when the structure shown in FIG. 7 is employed, the transition from the splay configuration to the bend configuration in the region of the optical filter layer 30 that corresponds to the downstream section of the pixel electrode 130 occurs readily.

As described above, when at least one of the structures shown in FIGS. 6 and 7 is employed in the pixel electrode 130, it is possible to make the transition from the splay configuration to the bend configuration readily occur in the region of the optical filter layer 30 that corresponds to the downstream section of the pixel electrode 130.

The transition of the splay configuration to the bend configuration is prone to spread at high speeds from the downstream side toward the upstream side.

Further, in the region of the optical filter layer 30 that corresponds to the upstream section of the pixel electrode 130, a disclination line is produced in the vicinity of the edge of the pixel electrode 130 that faces the upstream side over almost all the length of the particular edge. Thus, in the region of the optical filter layer 30 that corresponds to the upstream section of the pixel electrode 130, the transition from the splay configuration to the bend configuration occurs acceptably.

That is, when at least one of the structures shown in FIGS. 6 and 7 is employed, it is possible to make the transition from the splay configuration to the bend configuration readily occur over whole the optical filter layer 30. Therefore, it is possible to suppress that the regions where the transition does not proceed are produced in the optical filter layer 30 when turning on the power at low temperatures.

Next, the second embodiment will be described.

Figure 10:
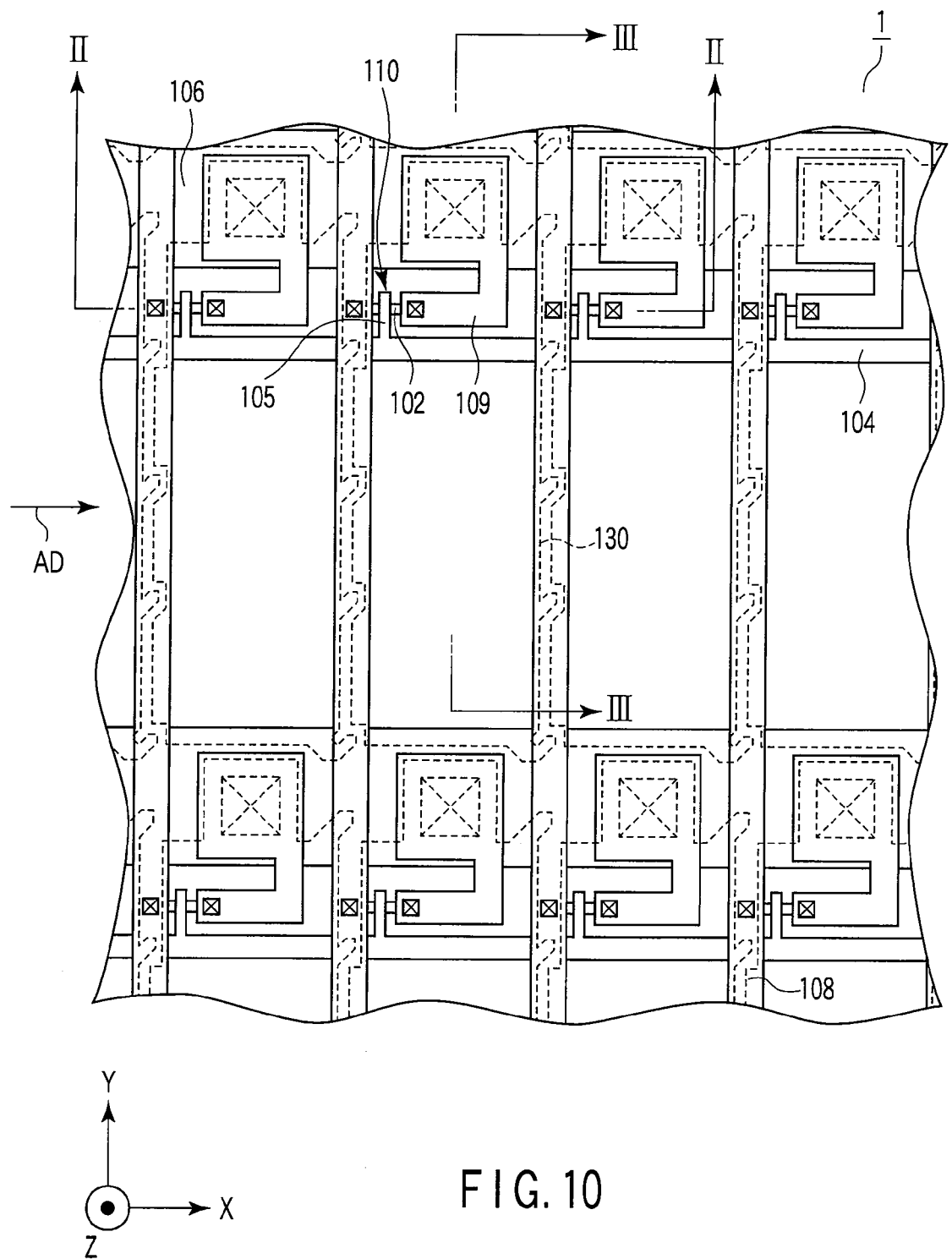
FIG. 10 is a plan view schematically showing a liquid crystal display according to a second embodiment.
Figure 11:
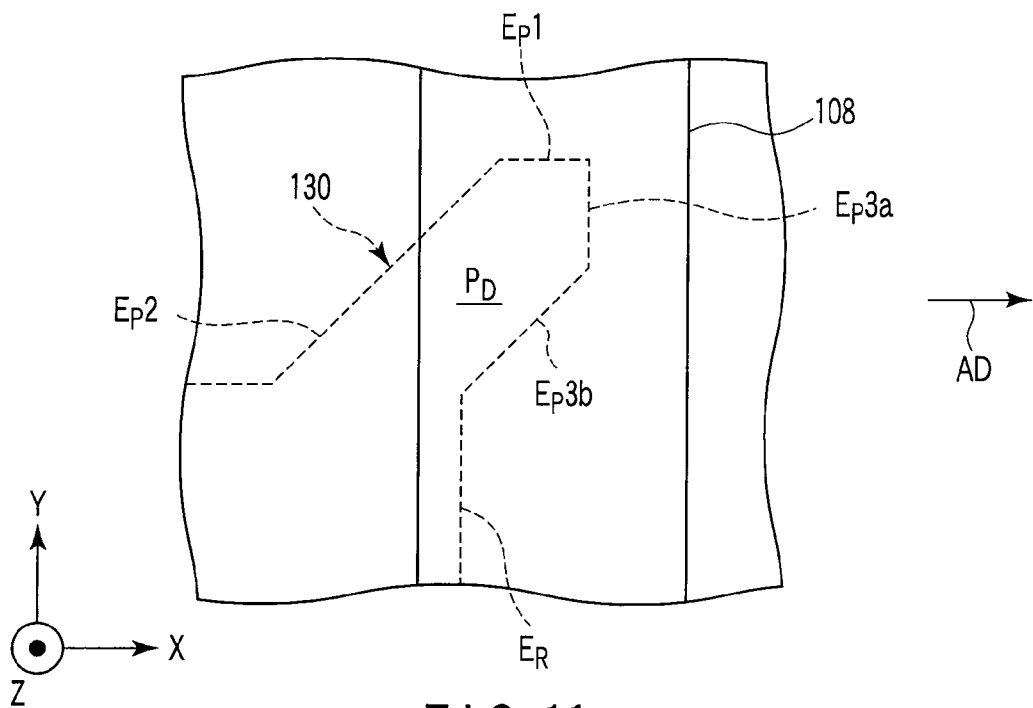
Figure 12:
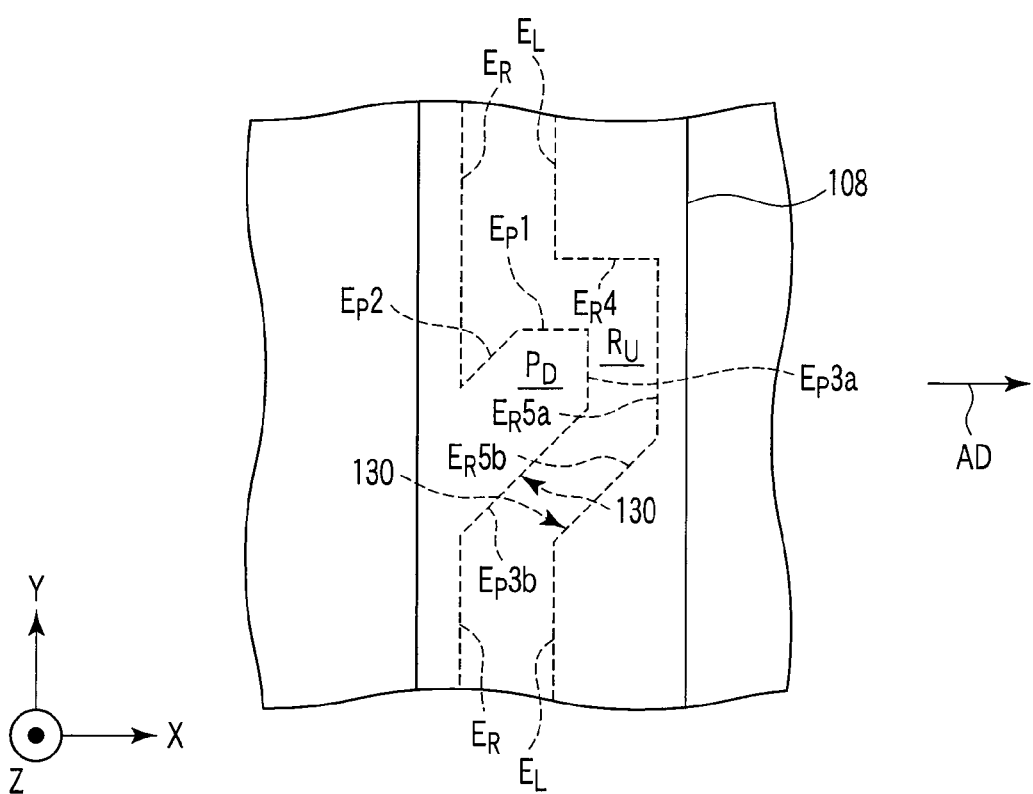

The liquid crystal display shown in FIG. 10 is an OCB-mode active matrix liquid crystal display. The liquid crystal display is almost the same as the liquid crystal display described with reference to FIGS. 1 to 7 except that the following structure is employed. That is, in this liquid crystal display, the alignment direction AD is the X-direction, the edge $E_R$ of the pixel electrode 130 that faces the downstream side is provided with the protrusions $P_D$ instead of the recesses $R_D$ as shown in FIGS. 10 to 12, and the edge $E_L$ is provided with recesses $R_U$ as shown in FIGS. 10, 12 and 13. Each recess $R_U$ forms on the upstream section of the pixel electrode 130 an edge $E_R4$ extending in the alignment direction AD, and edges $E_R5a$ and $E_R5b$ facing the upstream side and connecting the edge $E_R4$ to the edge $E_L$. Further, in the liquid crystal display, the protrusions of the signal lines 108 are omitted.

When such a structure is employed, similar to the case where the structure described with reference to FIGS. 1 to 7 is employed, it is possible to make the transition from the splay configuration to the bend configuration readily occur in the region of the optical filter layer 30 that corresponds to the downstream section of the pixel electrode 130.

In addition, in the region of the optical filter layer 30 that corresponds to the upstream section of the pixel electrode 130, a disclination line is produced in the vicinity of the edges $E_L$, $E_R5a$ and $E_R5b$ of the pixel electrode 130 that face the upstream side over almost whole the lengths of the particular edges. Moreover, in the vicinity of the edge $E_R4$, a twisted configuration with a high energy is formed. Thus, when this structure is employed, it is possible to make the transition from the splay configuration to the bend configuration readily occur in the region of the optical filter layer 30 that corresponds to the upstream section of the pixel electrode 130 for the same reason as that described with reference to FIG. 6.

That is, when the structures shown in FIGS. 10 to 13 are employed, it is possible to make the transition from the splay configuration to the bend configuration more readily occur over whole the optical filter layer 30. Therefore, it is possible to more effectively suppress that the regions where the transition does not proceed are produced in the optical filter layer 30 when turning on the power at low temperatures.

Moreover, in the liquid crystal display, the protrusions $P_D$ of each pixel electrode 130 are partially located in the recesses $R_U$ of the pixel electrode 130 adjacent thereto in the X-direction. Thus, the decrease in aperture ratio due to the protrusions $P_D$ is small, or alternatively, almost no decrease in aperture ratio due to the protrusions $P_D$ occurs.

Next, the third embodiment will be described.

Figure 14:
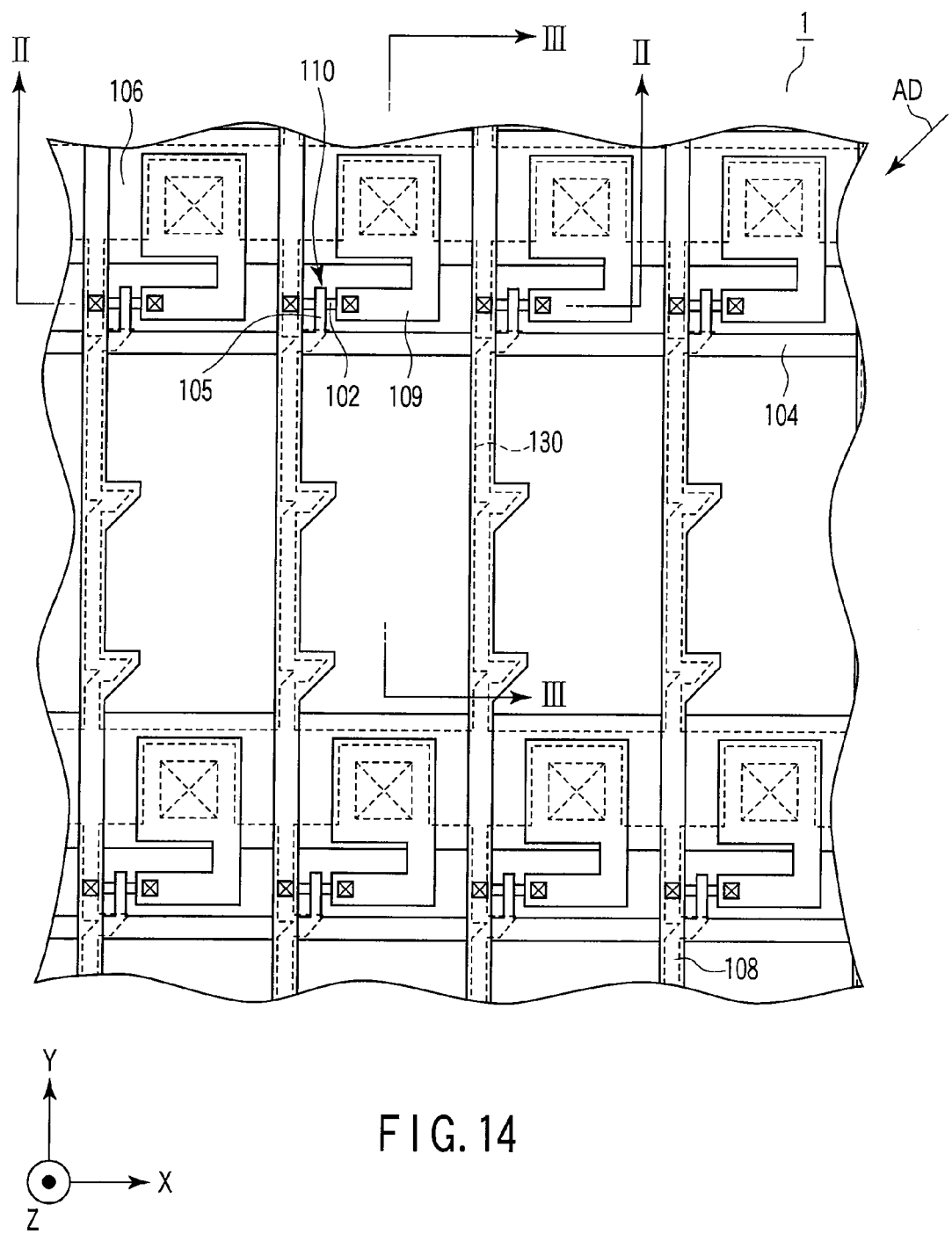
FIG. 14 is a plan view schematically showing a liquid crystal display according to a third embodiment.

The liquid crystal display shown in FIG. 14 is an OCB-mode active matrix liquid crystal display. The liquid crystal display is almost the same as the liquid crystal display described with reference to FIGS. 1 to 7 except that the following structure is employed. That is, in this liquid crystal display, the alignment direction AD is reversed relative to that of the liquid crystal display described with reference to FIGS. 1 to 7, and the recesses $R_D$ are provided to the edge $E_L$ of the pixel electrode 130 instead of the edge $E_R$ of the pixel electrode 130 as shown in FIGS. 14 and 15. In addition, the edge $E_R$ of the pixel electrode 130 is provided with protrusions $P_U$ protruding from the edge $E_R$ toward the upstream side as shown in FIGS. 14 and 15. Each protrusion $P_U$ includes an edge $E_F4$ extending in the alignment direction AD, and an edge $E_F5$ connecting the edge $E_F4$ to the edge $E_R$ and facing the upstream side.

When such a structure is employed, similar to the case where the structure described with reference to FIGS. 1 to 7 is employed, it is possible to make the transition from the splay configuration to the bend configuration readily occur in the region of the optical filter layer 30 that corresponds to the downstream section of the pixel electrode 130.

In addition, in the region of the optical filter layer 30 that corresponds to the upstream section of the pixel electrode 130, a disclination line is produced in the vicinity of the edges $E_R$ and $E_F5$ of the pixel electrode 130 that face the upstream side over almost whole the lengths of the particular edges. Moreover, in the vicinity of the edge $E_F4$, a twisted configuration with a high energy is formed. Thus, when this structure is employed, it is possible to make the transition from the splay configuration to the bend configuration readily occur in the region of the optical filter layer 30 that corresponds to the upstream section of the pixel electrode 130 for the same reason as that described with reference to FIG. 7.

That is, when the structures shown in FIGS. 14 and 15 are employed, it is possible to make the transition from the splay configuration to the bend configuration more readily occur over whole the optical filter layer 30. Therefore, it is possible to more effectively suppress that the regions where the transition does not proceed are produced in the optical filter layer 30 when turning on the power at low temperatures.

Further, in the liquid crystal display, the sizes of the recesses $R_D$ provided to the downstream section of the pixel electrode 130 are larger than the sizes of the protrusions $P_U$ provided to the upstream section of the pixel electrode 130. As described above, in the region of the optical filter layer 30 that corresponds to the upstream section of the pixel electrode 130, the disclination line is produced in the vicinity of the edges $E_R$ and $E_F5$ of the pixel electrode 130 that face the upstream side over almost whole the lengths of the particular edges. In contrast, in the region of the optical filter layer 30 that corresponds to the downstream section of the pixel electrode 130, the disclination line is produced only in the vicinity of the edge $E_R2$ of the pixel electrode 130 that faces the upstream side. For this reason, in the region of the optical filter layer that corresponds to the downstream section of the pixel electrode 130, the transition from the splay configuration to the bend configuration less readily occurs than in the region that corresponds to the upstream section. When the recesses $R_D$ are larger than the protrusions $P_U$, it is possible to make the transition from the splay configuration to the bend configuration occur more readily as compared with the case where the recesses $R_D$ are smaller than the protrusions $P_U$ or the case where they have the same sizes.

Moreover, in the liquid crystal display, the protrusions $P_U$ of each pixel electrode 130 are partially located in the recesses $R_D$ of the pixel electrode 130 adjacent thereto in the X-direction. Thus, the decrease in aperture ratio due to the protrusions $P_U$ is small, or alternatively, almost no decrease in aperture ratio due to the protrusions $P_U$ occurs.

Next, the fourth embodiment will be described.

Figure 16:
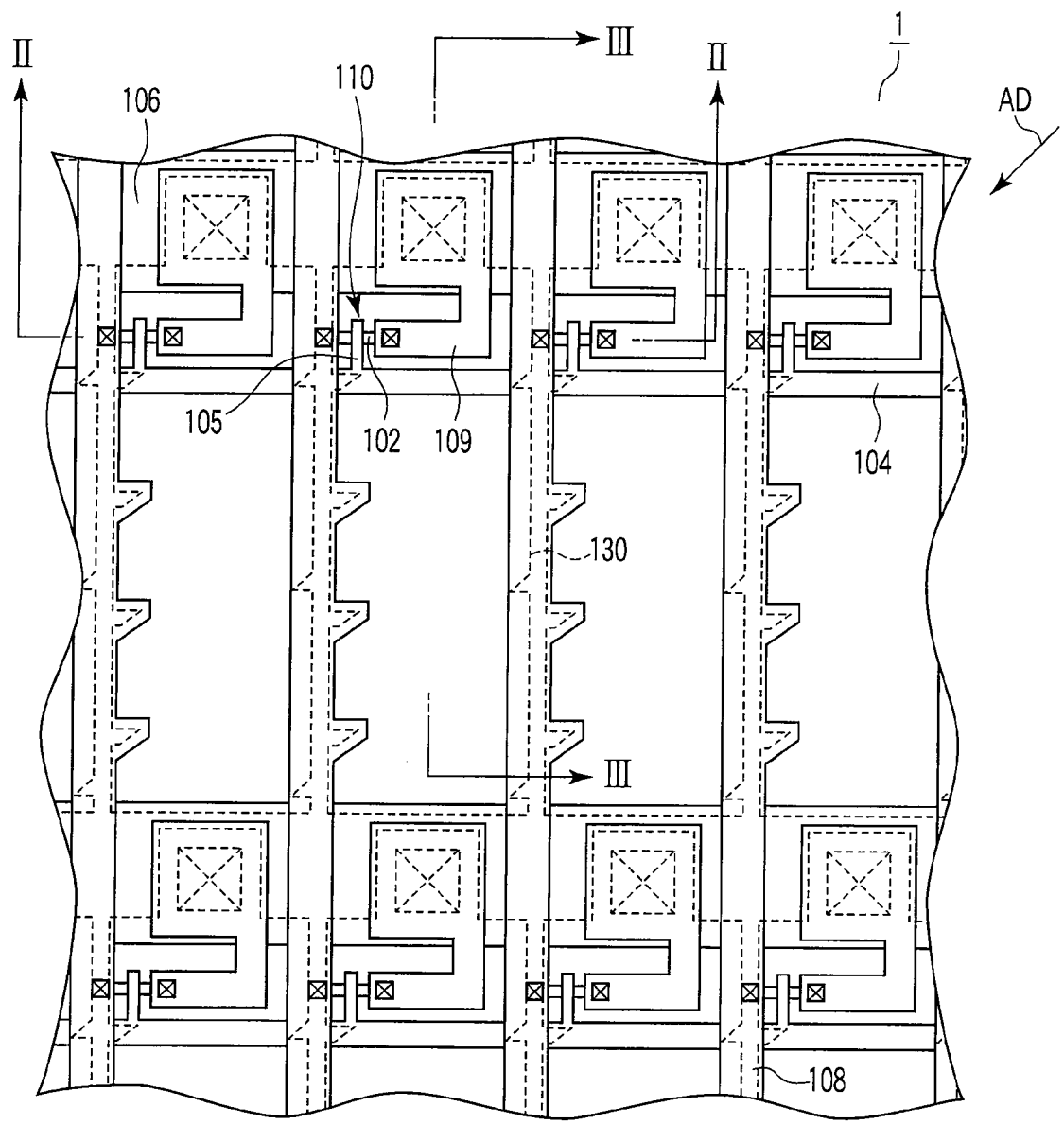
FIG. 16 is a plan view schematically showing a liquid crystal display according to a fourth embodiment.
Figure 17:
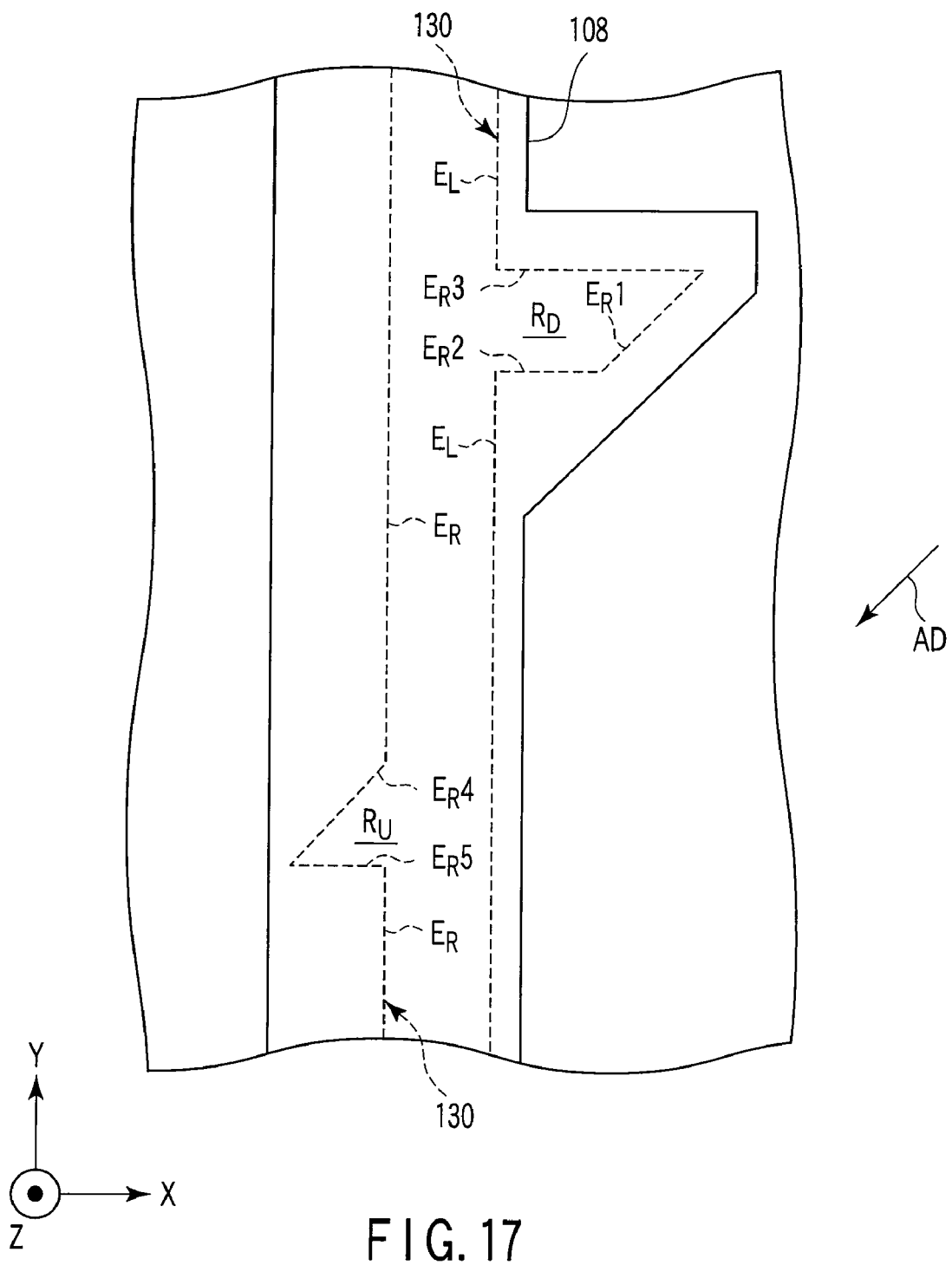
FIG. 17 is an enlarged plan view showing a part of the liquid crystal display shown in FIG. 16.

The liquid crystal display shown in FIG. 16 is an OCB-mode active matrix liquid crystal display. The liquid crystal display is almost the same as the liquid crystal display described with reference to FIGS. 14 and 15 except that the edge $E_R$ of the pixel electrode 130 is provided with the recesses $R_U$ instead of the protrusions $P_U$ as shown in FIGS. 16 and 17. When such a structure is employed, it is possible to more effectively suppress that the regions where the transition does not proceed are produced in the optical filter layer 30 when turning on the power.

Further, in the liquid crystal display, it is not necessary to make the positions in the Y-direction of the recesses $R_D$ and $R_U$ coincident among the pixels 130 adjacent in the X-direction. That is, when the particular structure is employed, high design flexibility can be achieved.

It is noted that the recesses $R_D$ are higher in number than the recesses $R_U$. By adjusting the ratio of the number of the recesses $R_D$ with respect to the number of the recesses $R_U$ or by adjusting the ratio of the size of the recess $R_D$ with respect to the size of the recess $R_U$, the readiness of the transition from the splay configuration to the bend configuration can be changed.

Also, in the region of the optical filter layer 30 that corresponds to the upstream section of the pixel electrode 130, a disclination line is produced in the vicinity of the edges $E_R$ and $E_R5$ of the pixel electrode 130 that face the upstream side over almost whole the lengths of the particular edges. In addition, a twisted configuration having a high energy is formed in the vicinity of the edge $E_R4$. Thus, when such a structure is employed, for the same reason as that described with reference to FIG. 7, it is possible to make the transition from the splay configuration to the bend configuration more readily occur in the region of the optical filter layer 30 that corresponds to the upstream section of the pixel electrode 130.

Next, the fifth embodiment will be described.

Figure 18:
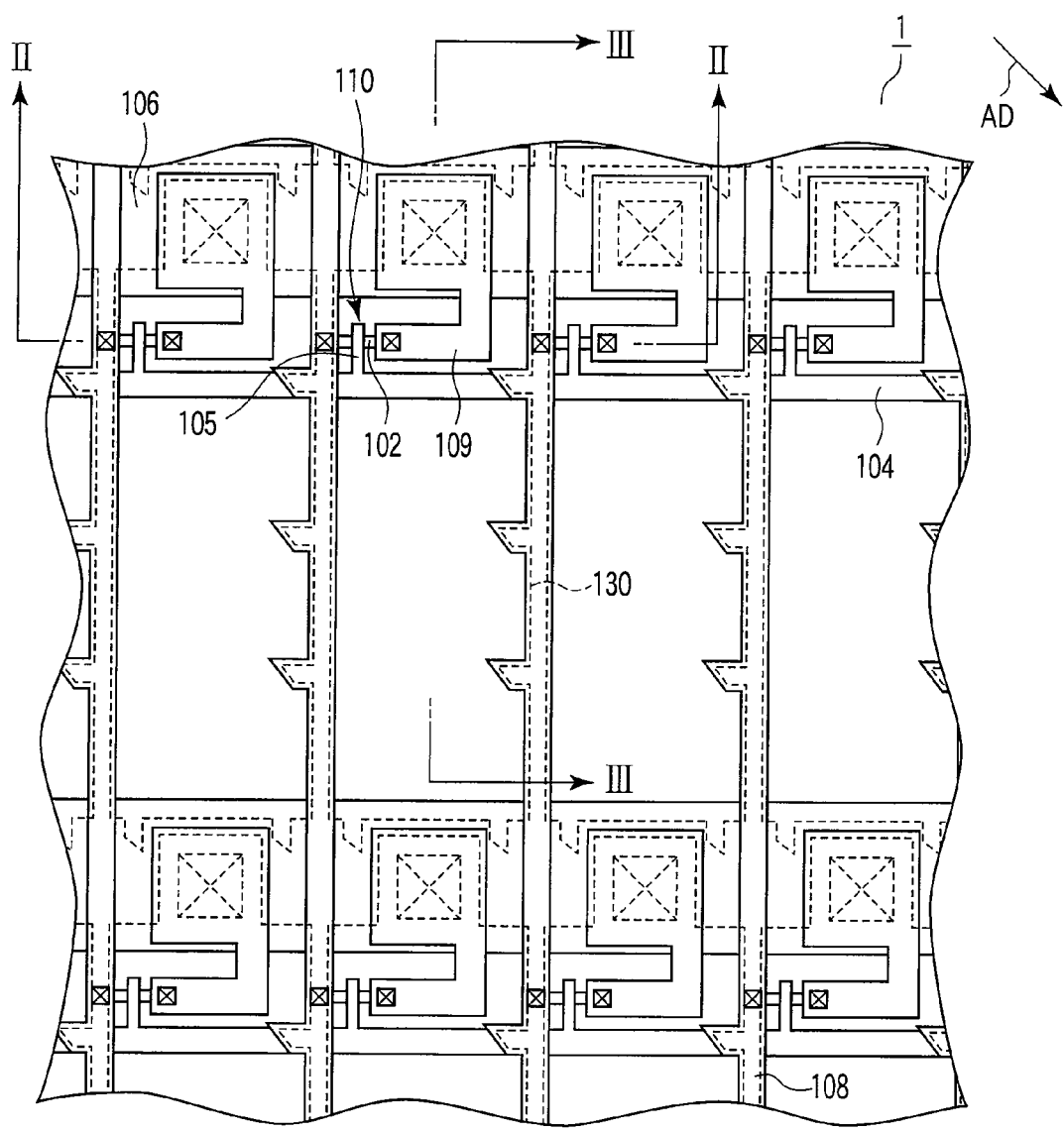
FIG. 18 is a plan view schematically showing a liquid crystal display according to a fifth embodiment.

The liquid crystal display shown in FIG. 18 is an OCB-mode active matrix liquid crystal display. The liquid crystal display is almost the same as the liquid crystal display described with reference to FIGS. 1 to 7 except that the following structure is employed.

Figure 19:
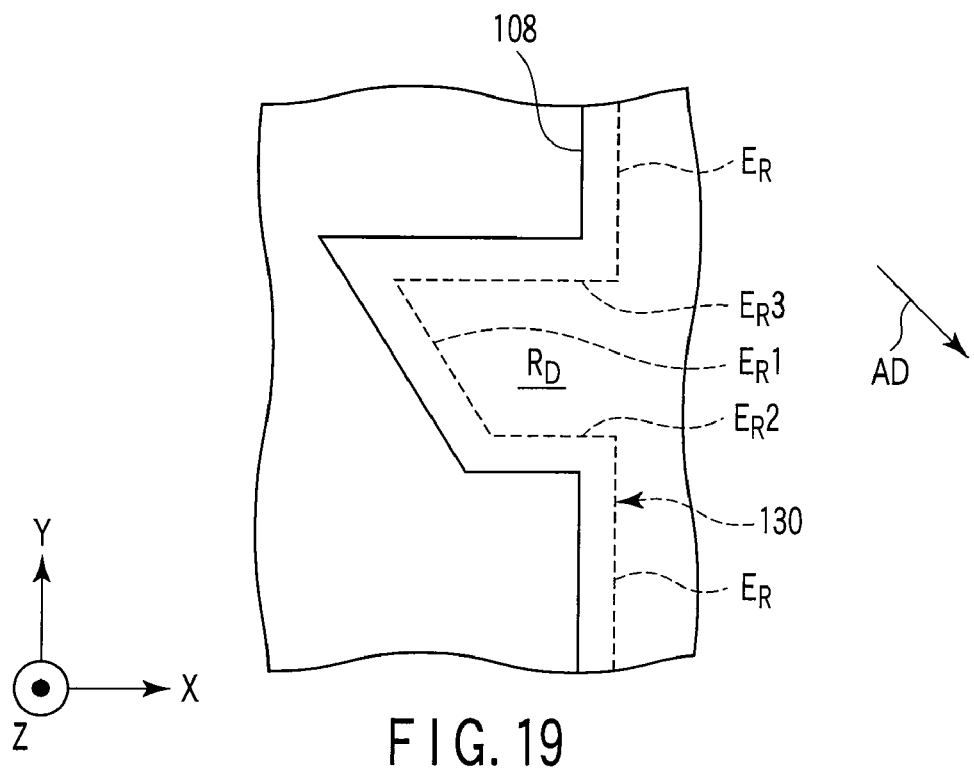
FIGS. 19 and 20 are enlarged plan views each showing a part of the liquid crystal display shown in FIG. 18.
Figure 20:
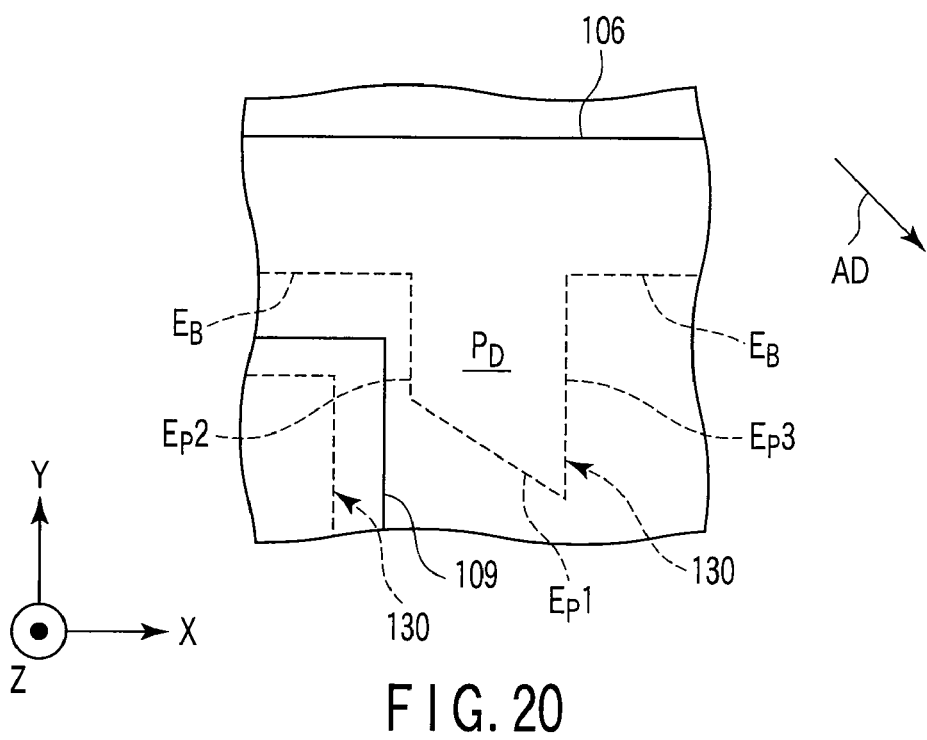

That is, in the liquid crystal display, the alignment direction AD is rotated 90° about an axis parallel with the Z-direction with respect to the alignment direction AD in the liquid crystal display described with reference to FIGS. 1 to 7. Further, in the liquid crystal display, the protrusions $P_D$ are omitted from the right edge $E_R$ of the pixel electrode 130, and the protrusion $P_D$ is further provided to the bottom edge $E_B$ of the pixel electrode 130 as shown in FIGS. 18 to 20.

When such a structure that the alignment direction AD is oblique with respect to the sides of the pixel electrode 130 having an almost quadrilateral shape is employed, the recesses $R_D$ and/or the protrusions $P_D$ can be provided to the two sides of the pixel electrode 130 facing the downstream side. That is, much more recesses $R_D$ and/or protrusions $P_D$ can be arranged. Thus, when such a structure is employed, it is possible to make the transition from the splay configuration to the bend configuration more readily occur in the region of the optical filter layer 30 that corresponds to the downstream section of the pixel electrode 130 as compared with the case where the structure described with reference to FIGS. 1 to 7 is employed. Therefore, it is possible to more effectively suppress that the regions where the transition does not proceed are produced in the optical filter layer 30 when turning on the power at low temperatures.

Next, the sixth embodiment will be described.

Figure 21:
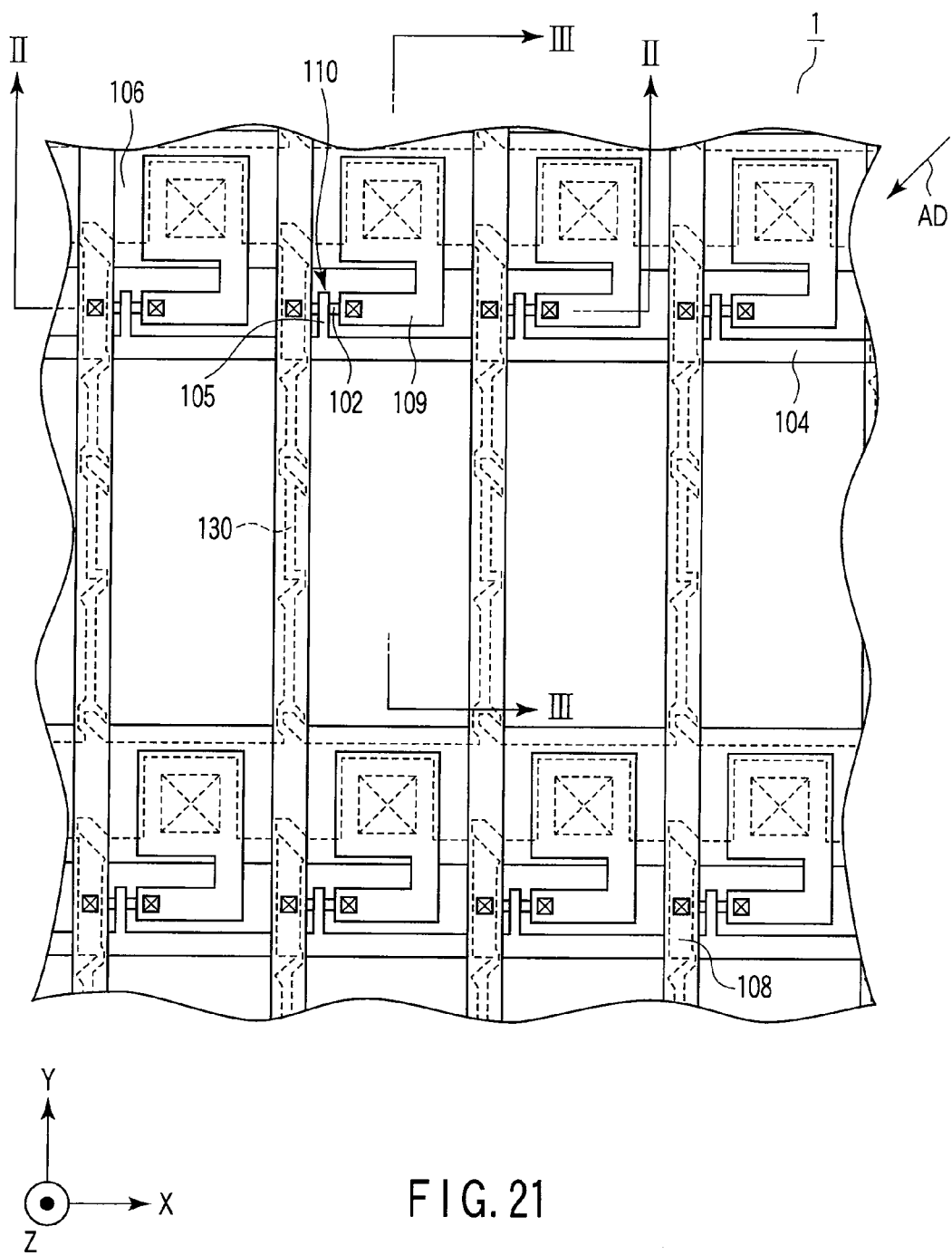
FIG. 21 is a plan view schematically showing a liquid crystal display according to a sixth embodiment.

The liquid crystal display shown in FIG. 21 is an OCB-mode active matrix liquid crystal display. The liquid crystal display is almost the same as the liquid crystal display described with reference to FIGS. 1 to 7 except that the following structure is employed. That is, in the liquid crystal display, the alignment direction AD is reversed relative to the alignment direction AD of the liquid crystal display described with reference to FIGS. 1 to 7. Further, in the liquid crystal display, the recesses $R_D$ and the protrusions $P_D$ are provided to the right edge $E_R$ of the pixel electrode 130, and the recesses $R_U$ and the protrusions $P_U$ are provided to the left edge $E_L$ of the pixel electrode 130 as shown in FIGS. 21 to 26.

Figure 24:
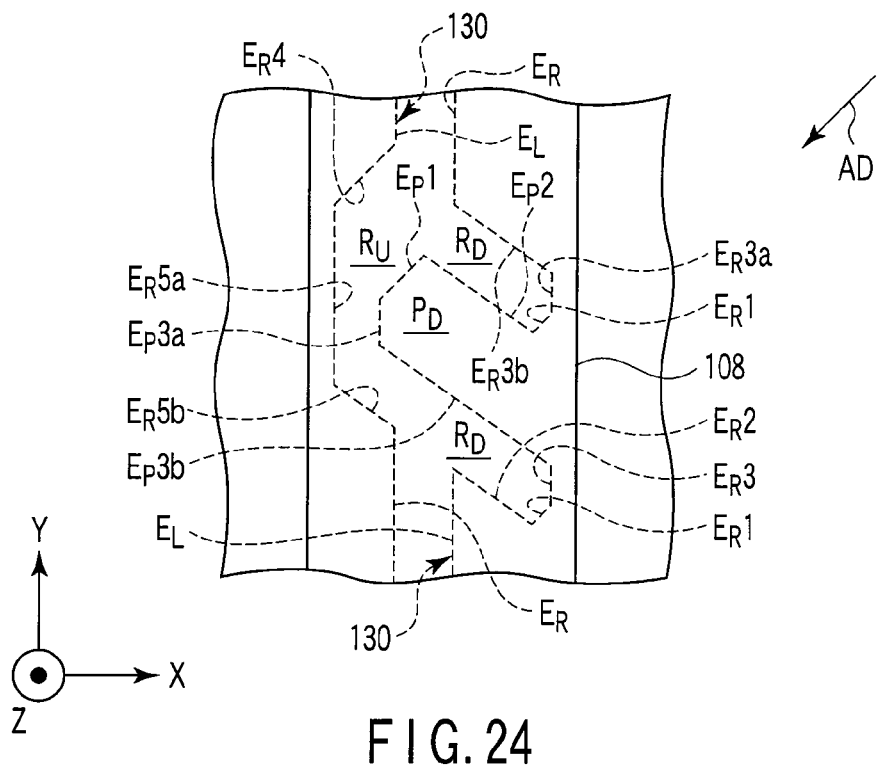
Figure 26:
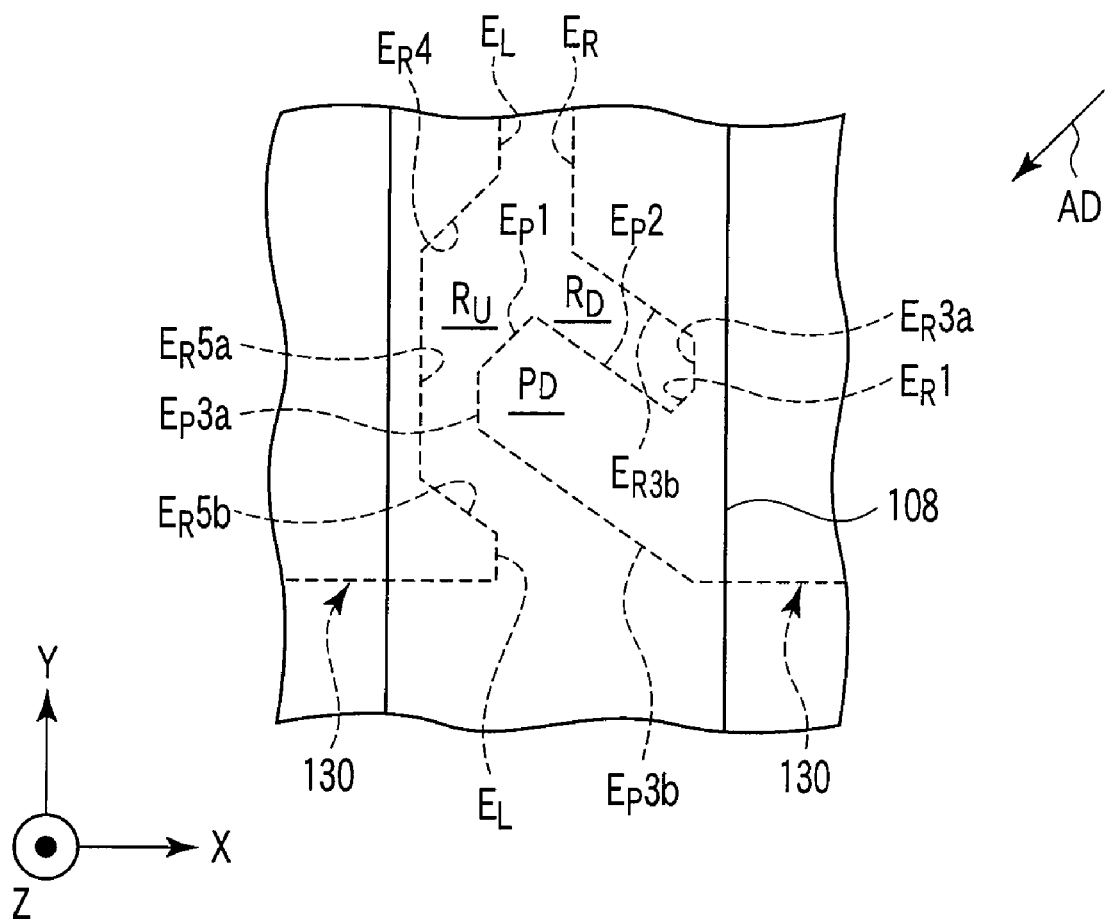

It is noted that in FIGS. 24 and 26, the edge $E_P2$ also serves as the edge $E_R2$. That is, the edge $E_P2$ plays the roles of edges $E_P2$ and $E_R2$.

When such a structure is employed, similar to the case where the structure described with reference to FIGS. 1 to 7 is employed, it is possible to make the transition from the splay configuration to the bend configuration readily occur in the region of the optical filter layer 30 that corresponds to the downstream section of the pixel electrode 130. In addition, when such a structure is employed, it is possible to make the transition from the splay configuration to the bend configuration readily occur in the region of the optical filter layer 30 that corresponds to the upstream section of the pixel electrode 130. That is, when the structures shown in FIGS. 21 to 26 are employed, it is possible to make the transition from the splay configuration to the bend configuration more readily occur over whole the optical filter layer 30. Therefore, it is possible to more effectively suppress that the regions where the transition does not proceed are produced in the optical filter layer 30 when turning on the power at low temperatures.

Further, in the liquid crystal display, both the recesses $R_D$ and the protrusions $P_D$ are provided to edge $E_R$ of the pixel electrode 130 that faces the downstream side. In addition, the recesses $R_D$ and the protrusions $P_D$ are adjacent to one another. When such a structure is employed, the recesses $R_D$ and the protrusions $P_D$ can be arranged at higher density as compared with the case where only the recesses $R_D$ or the protrusions $P_D$ are provided to the edge $E_R$.

In the above-described liquid crystal displays, it is not necessary that the edges $E_P1$ and $E_R1$ and the alignment direction AD are dead parallel, provided that they are almost parallel with each other. Similarly, it is not necessary that the edge $E_R4$ and the alignment direction AD are dead parallel, provided that they are almost parallel with each other. The angle that each of the edges $E_P1$, $E_R1$ and $E_R4$ makes with the alignment direction AD is set, for example, within a range from −15° to +15°, and typically, within a range from −5° to +5°.

Theoretically, the angle that the alignment direction AD makes with the edge $E_R2$ can be larger than 0° and less than 180°. Typically, the angle is set within a range from 45° to 135°. Theoretically, the angle that the alignment direction AD makes with the edge $E_P2$ can be larger than 0° and less than 180°. Typically, the angle is set within a range from 30° to 150°. When these angles are small or large, it may become difficult to produce the disclination line DL.

The length of the edge $E_R1$ is, for example, 1 μm or more, and typically, 3 μm or more. The length of the edge $E_P1$ is, for example, 1 μm or more, and typically, 3 μm or more. When the edge $E_R1$ or $E_P1$ is short, it may become difficult to produce the twisted configuration.

The length of the edge $E_R1$ is, for example, half the size of the pixel electrode 130 in the direction parallel with the edge $E_R1$ at the maximum, and typically, 20 μm or less. The length of the edge $E_P1$ is, for example, half the size of the pixel electrode 130 in the direction parallel with the edge $E_P1$ at the maximum, and typically, 20 μm or less. When the edge $E_R1$ or $E_P1$ is long, it may become difficult to achieve a high aperture ratio.

The length of the edge $E_R2$ is, for example, 1 μm or more, and typically, 3 μm or more. The length of the edge $E_P2$ is, for example, 1 μm or more, and typically, 3 μm or more. When the edge $E_R2$ or $E_P2$ is short, it may become difficult to produce the disclination line DL having a sufficient length.

The length of the edge $E_R2$ is, for example, half the size of the pixel electrode 130 in the direction parallel with the edge $E_R2$ at the maximum, and typically, 20 μm or less. The length of the edge $E_P2$ is, for example, half the size of the pixel electrode 130 in the direction parallel with the edge $E_P2$ at the maximum, and typically, 20 μm or less. When the edge $E_R2$ or $E_P2$ is long, it may become difficult to achieve a high aperture ratio.

End surfaces of the pixel electrode 130 may be inclined such that the cross section of the pixel electrode 130 has a forward tapered shape. In this case, it is possible to more effectively suppress that the regions where the transition does not proceed are produced in the optical filter layer 30. Such a pixel electrode 130 can be obtained, for example, by forming a resist pattern on a conductive layer and wet-etching the conductive layer using the resist pattern as an etching mask under appropriate conditions.

To the above-described liquid crystal displays, various modifications can be possible.

For example, at least one of the recesses $R_D$ may be substituted by protrusions $P_D$, and at least one of the protrusions $P_D$ may be substituted by recesses $R_D$. At least one of the recesses $R_U$ may be substituted by protrusions $P_U$, and at least one of the protrusions $P_U$ may be substituted by recesses $R_U$.

In the liquid crystal displays, driving methods other than the active matrix driving method can be employed. For example, a passive matrix driving method or a segment driving method may be employed.

Examples of the present invention will be described below.

EXAMPLE 1

In this example, the OCB-mode liquid crystal display described with reference to FIGS. 1 to 7 was manufactured by the following method. It is noted that in this example, the optical compensation film 40 was formed not on the outer surface of the back substrate 10, but only on the outer surface of the front substrate 20.

First, a structure including the undercoat layer 101 to the pixel electrodes 130 was formed on a 0.5-mm-thick glass substrate 100. On this structure, an $SiO_2$ layer and an acrylic resin layer were sequentially formed as the planarizing layer (not shown). Also, the common electrode 230 was formed on a 0.5-mm-thick glass substrate 200.

In this example, the pixel electrodes 130 had almost rectangular shapes, their pitch in the X-direction was 82 μm, and their pitch in the Y-direction was 246 μm. In each pixel electrode 130, four recesses $R_D$ and one protrusion $P_D$ were provided to the edge $E_R$.

The length of the edge $E_R1$ was 7 μm, the length of the edge $E_R2$ was 5 μm, and the length of the edge $E_R3$ was 10 μm. The angle that the edge $E_R1$ makes with the X-direction was 45°, the edge $E_R'$ was perpendicular to the edge $E_P1$, and the edges $E_R2$ and $E_R3$ were parallel with the X-direction.

The length of the edge $E_P1$ was 7 μm, the length of the edge $E_P2$ was 5 μm, and the length of the edge $E_R'$ was 7 μm. The angle that the edge $E_P1$ makes with the X-direction was 45°, and the edges $E_P2$ and $E_P3$ were parallel with the X-direction.

Then, each of the planarizing layer and the common electrode 230 was spin-coated with Optomer-AL3456 manufactured by JSR Corp., thereby forming a 0.1-μm-thick polyimide resin layer. After that, each polyimide resin layer was rubbed along the alignment direction AD shown in FIG. 1. In this manner, the alignment layers 140 and 240 were obtained.

Then, a thermosetting adhesive was dispensed on the main surface of the back substrate 10 so as to surround the alignment layer 140. An opening to be used as a liquid crystal injection port was formed in a frame formed by this adhesive layer. After the adhesive was pre-dried, silver paste was dispensed on a transfer pad (not shown).

Granular spacers 7.0 μm in diameter were then dispersed on the alignment layer 240. Although the granular spacers were dispersed as spacers in this example, columnar spacers may be formed using a photosensitive resin.

After that, the back substrate 10 and front substrate 20 were adhered such that the alignment layers 140 and 240 faced each other and their rubbing directions were equal, and the resultant structure was heated. In this way, an empty cell was obtained.

A nematic liquid crystal material having positive dielectric anisotropy was injected into this empty cell by dipping.

Subsequently, an ultraviolet-curing resin was dispensed in the liquid crystal injection port, and irradiated with ultraviolet radiation. In addition, a polarizer 50 was adhered on the outer surface of the back substrate 10, and an optical compensation film 40 and polarizer 50 were sequentially adhered on the outer surface of the front substrate 20.

Note that the optical compensation film 40 used in this example includes an optically anisotropic layer in which a discotic liquid crystal compound forms bend configuration such that the optical axis thereof changes in a plane perpendicular to the X-direction. In the optical compensation film 40, the direction of the maximum principal normal velocity is parallel to the direction of thickness, the direction of the minimum principal normal velocity is parallel to the X-direction, and the direction of the remaining principal normal velocity is parallel to the Y-direction.

The liquid crystal display panel 1 thus obtained was combined with a backlight unit (not shown) and the like, so as to complete the liquid crystal display described with reference to FIGS. 1 to 7.

The liquid crystal display was installed in a thermoregulator, and the temperature in the thermoregulator was set at −20° C. Then, the liquid crystal display was turned on while observing the pixels using a microscope. Specifically, an alternating voltage of ±15V was applied between the pixel electrodes 130 and the common electrode 230, and an alternating voltage of ±5V was applied between the pixel electrodes 130 and the signal lines 108. As a result, the average time required for a single pixel to change from the colored state that indicates the splay configuration to the achromatic state that indicates the bend configuration was 2.0 seconds. Also, the average time required for whole the screen to complete the color change was 2.5 seconds.

Note that the required times depend on the sizes of the pixels. Note also that the required times depend on the viscosity of the liquid crystal material. For example, when a liquid crystal material with a lower viscosity is used, the required times become shorter. The required times further depend on the conditions for the determination. For example, the required times will become longer when the determination is carried out at a lower temperature, and the required times will become shorter when a higher voltage is applied.

EXAMPLE 2

In this example, the OCB-mode liquid crystal display described with reference to FIGS. 10 to 13 was manufactured by the following method. That is, the structures shown in FIGS. 10 to 13 were employed in the pixel electrodes 130, and the alignment direction AD was parallel with the X-direction. Except for them, the liquid crystal display was manufactured by the same method as that described in Example 1.

In this example, the pixel electrodes 130 had almost rectangular shapes, and their pitches in the X-direction and Y-direction were the same as Example 1. In each pixel electrode 130, five protrusions $P_D$ were provided to the edge $E_R$ and four recesses $R_D$ were provided to the edge $E_L$.

In the protrusion $P_D$ shown in FIG. 11, the length of the edge $E_P1$ was 7 μm, the length of the edge $E_P2$ was 20 μm, the length of the edge $E_P3a$ was 7 μm, and the length of the edge $E_P3b$ was 10 μm. The edge $E_P1$ was parallel with the X-direction, the angle that each of the edges $E_P2$ and $E_P3b$ makes with the X-direction was 45°, and the edge $E_P3a$ was parallel with the Y-direction.

In the protrusion $P_D$ shown in FIG. 12, the length of the edge $E_P1$ was 5 μm, the length of the edge $E_P2$ was 7 μm, the length of the edge $E_P3a$ was 5 μm, and the length of the edge $E_P3b$ was 14 μm. The edge $E_P1$ was parallel with the X-direction, the angle that each of the edges $E_P2$ and $E_P3b$ makes with the X-direction was 45°, and the edge $E_P3a$ was parallel with the Y-direction.

In the recess $R_U$ shown in FIG. 12, the length of the edge $E_R4$ was 7.5 μm, the length of the edge $E_R5a$ was 13.5 μm, and the length of the edge $E_R5b$ was 10.5 μm. The edge $E_R4$ was parallel with the X-direction, the edge $E_R5a$ was parallel with the Y-direction, and the angle that the edges $E_R5b$ makes with the X-direction was 45°.

In the protrusion $P_D$ shown in FIG. 13, the length of the edge $E_P1$ was 5 μm, the length of the edge $E_P2$ was 7 μm, the length of the edge $E_P3a$ was 5 μm, and the length of the edge $E_P3b$ was 14 μm. The edge $E_P1$ was parallel with the X-direction, the angle that each of the edges $E_P2$ and $E_P3b$ makes with the X-direction was 45°, and the edge $E_P3a$ was parallel with the Y-direction.

In the recess $R_U$ shown in FIG. 13, the length of the edge $E_R4$ was 7.5 μm, and the length of the edge $E_R5$ was 10 μm. The edge $E_R4$ was parallel with the X-direction, and the edge $E_R5$ was parallel with the Y-direction.

For the liquid crystal display, the time required for the transition from the splay configuration to the bend configuration was determined by the same method as in Example 1. As a result, the average time required for a single pixel to change from the colored state to the achromatic state was 1.1 seconds. Also, the average time required for whole the screen to complete the color change was 1.3 seconds.

EXAMPLE 3

In this example, the OCB-mode liquid crystal display described with reference to FIGS. 14 and 15 was manufactured by the following method. That is, the structures shown in FIGS. 14 and 15 were employed in the pixel electrodes 130, and the alignment direction AD was rotated 180° about the axis that is parallel with the Z-direction. Except for them, the liquid crystal display was manufactured by the same method as that described in Example 1.

In this example, the pixel electrodes 130 had almost rectangular shapes, and their pitches in the X-direction and Y-direction were the same as Example 1. In each pixel electrode 130, three protrusions $P_U$ were provided to the edge $E_R$ and three recesses $R_D$ were provided to the edge $E_L$.

In each recess $R_D$, the length of the edge $E_R1$ was 10 μm, the length of the edge $E_R2$ was 5 μm, and the length of the edge $E_R3$ was 12 μm. The angle that the edge $E_R1$ makes with the X-direction was 45°, and the edges $E_R2$ and $E_R3$ were parallel with the X-direction.

In each protrusion $P_U$, the length of the edge $E_P4$ was 7 μm, and the length of the edge $E_P5$ was 5 μm. The angle that the edge $E_P4$ makes with the X-direction was 45°, and the edge $E_P5$ was parallel with the X-direction.

For the liquid crystal display, the time required for the transition from the splay configuration to the bend configuration was determined by the same method as in Example 1. As a result, the average time required for a single pixel to change from the colored state to the achromatic state was 1.3 seconds. Also, the average time required for whole the screen to complete the color change was 1.5 seconds.

EXAMPLE 4

In this example, the OCB-mode liquid crystal display described with reference to FIGS. 16 and 17 was manufactured by the following method. That is, the structures shown in FIGS. 16 and 17 were employed in the pixel electrodes 130, and the alignment direction AD was reversed. Except for them, the liquid crystal display was manufactured by the same method as that described in Example 1.

In this example, the pixel electrodes 130 had almost rectangular shapes, and their pitches in the X-direction and Y-direction were the same as Example 1. In each pixel electrode 130, three recesses $R_U$ were provided to the edge $E_R$ and four recesses $R_D$ were provided to the edge $E_L$.

In each recess $R_D$, the length of the edge $E_R1$ was 7 μm, the length of the edge $E_R2$ was 5 μm, and the length of the edge $E_R3$ was 10 μm. The angle that the edge $E_R1$ makes with the X-direction was 45°, and the edges $E_R2$ and $E_R3$ were parallel with the X-direction.

In each recess $R_U$, the length of the edge $E_R4$ was 7 μm, and the length of the edge $E_R5$ was 5 μm. The angle that the edge $E_R4$ makes with the X-direction was 45°, and the edge $E_R5$ was parallel with the X-direction.

For the liquid crystal display, the time required for the transition from the splay configuration to the bend configuration was determined by the same method as in Example 1. As a result, the average time required for a single pixel to change from the colored state to the achromatic state was 1.1 seconds. Also, the average time required for whole the screen to complete the color change was 1.3 seconds.

EXAMPLE 5

In this example, the OCB-mode liquid crystal display described with reference to FIGS. 18 to 20 was manufactured by the following method. That is, the structures shown in FIGS. 18 to 20 were employed in the pixel electrodes 130, and the alignment direction AD was rotated 90° about the axis that is parallel with the Z-direction. Except for them, the liquid crystal display was manufactured by the same method as that described in Example 1.

In this example, the pixel electrodes 130 had almost rectangular shapes, and their pitches in the X-direction and Y-direction were the same as Example 1. In each pixel electrode 130, three recesses $R_D$ were provided to the edge $E_R$ and two protrusions $P_D$ were provided to the edge $E_B$.

In each recess $R_D$, the length of the edge $E_R1$ was 7 μm, the length of the edge $E_R2$ was 5 μm, and the length of the edge $E_R3$ was 10 μm. The angle that the edge $E_R1$ makes with the X-direction was 45°, and the edges $E_R2$ and $E_R3$ were parallel with the X-direction.

In each protrusion $P_D$, the length of the edge $E_P1$ was 7 μm, the length of the edge $E_P2$ was 5 μm, and the length of the edge $E_P3$ was 10 μm. The angle that the edge $E_P1$ makes with the X-direction was 45°, and the edges $E_P2$ and $E_P3$ were parallel with the Y-direction.

For the liquid crystal display, the time required for the transition from the splay configuration to the bend configuration was determined by the same method as in Example 1. As a result, the average time required for a single pixel to change from the colored state to the achromatic state was 1.6 seconds. Also, the average time required for whole the screen to complete the color change was 2.0 seconds.

EXAMPLE 6

In this example, the OCB-mode liquid crystal display described with reference to FIGS. 21 to 26 was manufactured by the following method. That is, the structures shown in FIGS. 22 to 26 were employed in the pixel electrodes 130, and the alignment direction AD was rotated 180° about the axis that is parallel with the Z-direction. Except for them, the liquid crystal display was manufactured by the same method as that described in Example 1.

In this example, the pixel electrodes 130 had almost rectangular shapes, and their pitches in the X-direction and Y-direction were the same as Example 1. In each pixel electrode 130, two protrusions $P_U$ and two recesses $R_U$ were provided to the edge $E_R$ and three protrusions $P_D$ and five recesses $R_D$ were provided to the edge $E_L$.

Figure 22:
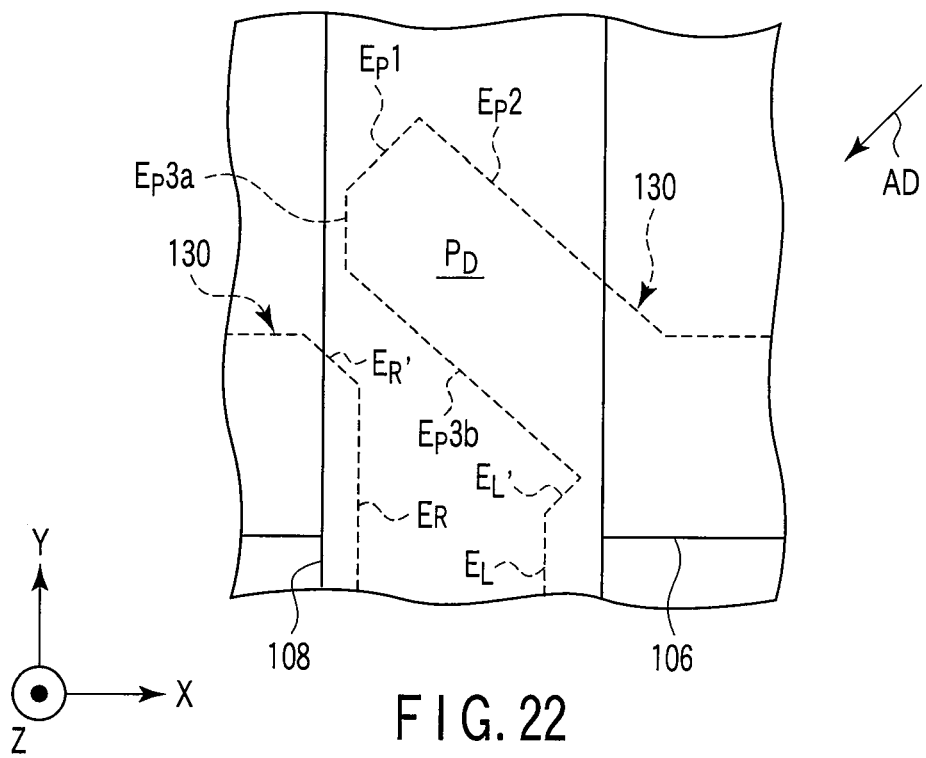
FIGS. 22 to 26 are enlarged plan views each showing a part of the liquid crystal display shown in FIG. 21.

Specifically, in the structure shown in FIG. 22, the length of the edge $E_P1$ was 5.5 μm, the length of the edge $E_P2$ was 20 μm, the length of the edge $E_P3a$ was 5 μm, and the length of the edge $E_P3b$ was 15.5 μm. The length of the edge $E_L'$ was 3 μm, and the length of the edge $E_R'$ was 4 μm. The angle that each of the edges $E_P1$ and $E_L'$ makes with the X-direction was 45°, the edges $E_P2$, $E_P3b$ and $E_R'$ were perpendicular to the edges $E_P1$ and $E_L'$, and the edge $E_P3a$ was parallel with the Y-direction.

Figure 23:
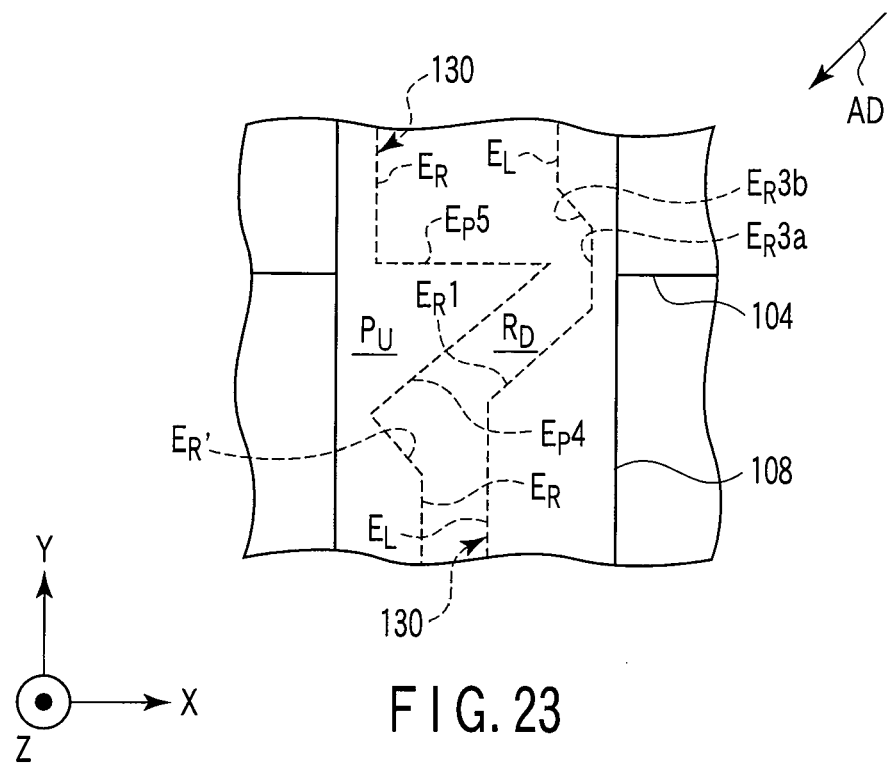

In the structure shown in FIG. 23, the length of the edge $E_R1$ was 5.5 μm, the length of the edge $E_R3a$ was 3 μm, the length of the edge $E_R3b$ was 3 μm, the length of the edge $E_P4$ was 11 μm, the length of the edge $E_P5$ was 8 μm, and the length of the edge $E_R'$ was 4 μm. The angle that each of the edges $E_R1$ and $E_P4$ makes with the X-direction was 45°, the edges $E_R3b$ and $E_R'$ were perpendicular to the edges $E_R1$ and $E_P4$, the edge $E_R3a$ was parallel with the Y-direction, and the edge $E_P5$ was parallel with the X-direction.

In the structure shown in FIG. 24, the length of the edge $E_R1$ was 1 μm, the length of the edge $E_R2$ was 5.5 μm, each length of the edges $E_R3$ and $E_R3a$ was 2 μm, the length of the edge $E_R3b$ was 5.5 μm, the length of the edge $E_P1$ was 1 μm, the length of the edge $E_P2$ was 9.5 μm, the length of the edge $E_P3a$ was 4 μm, the length of the edge $E_P3b$ was 11 μm, the length of the edge $E_R4$ was 4 μm, the length of the edge $E_R5a$ was 8 μm, and the length of the edge $E_R5b$ was 4 μm. The angle that each of the edges $E_R1$, $E_P1$ and $E_R4$ makes with the X-direction was 45°, the edges $E_R2$, $E_R3b$, $E_P2$, $E_P3b$ and $E_R5b$ were perpendicular to the edges $E_R1$, $E_P1$ and $E_R4$, and the edges $E_R3$, $E_R3a$, $E_P3a$ and $E_R5a$ were parallel with the Y-direction.

Figure 25:
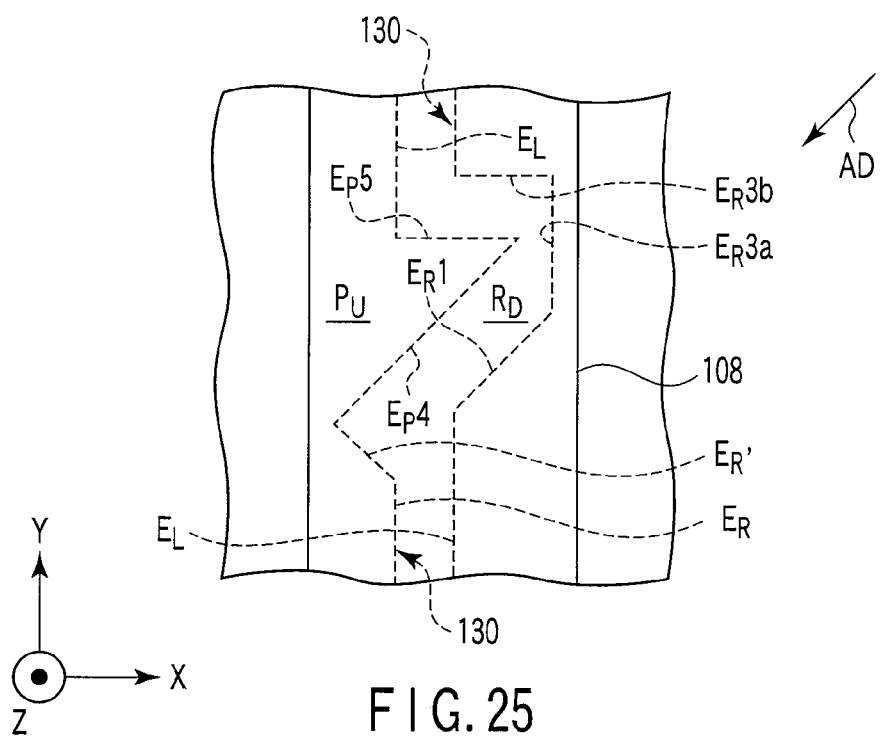

In the structure shown in FIG. 25, the length of the edge $E_R1$ was 5.5 μm, the length of the edge $E_R3a$ was 5 μm, the length of the edge $E_R3b$ was 4 μm, the length of the edge $E_P4$ was 11 μm, the length of the edge $E_P5$ was 5 μm, and the length of the edge $E_R'$ was 4 μm. The angle that each of the edges $E_R1$ and $E_P4$ makes with the X-direction was 45°, the edge $E_R'$ was perpendicular to the edges $E_R1$ and $E_P4$, the edge $E_R3a$ was parallel with the Y-direction, and the edges $E_R3b$ and $E_P5$ were parallel with the X-direction.

In the structure shown in FIG. 26, the length of the edge $E_R1$ was 1 μm, the length of the edge $E_R3a$ was 2 μm, the length of the edge $E_R3b$ was 5.5 μm, the length of the edge $E_P1$ was 1 μm, the length of the edge $E_P2$ was 9.5 μm, the length of the edge $E_P3a$ was 4 μm, the length of the edge $E_P3b$ was 11 μm, the length of the edge $E_R4$ was 4 μm, the length of the edge $E_R5a$ was 8 μm, and the length of the edge $E_R5b$ was 4 μm. The angle that each of the edges $E_R1$, $E_P1$ and $E_R4$ makes with the X-direction was 45°, the edges $E_R3b$, $E_P2$, $E_P3b$ and $E_R5b$ were perpendicular to the edges $E_R1$, $E_P1$ and $E_R4$, and the edges $E_R3a$, $E_P3a$ and $E_R5a$ were parallel with the Y-direction.

For the liquid crystal display, the time required for the transition from the splay configuration to the bend configuration was determined by the same method as in Example 1. As a result, the average time required for a single pixel to change from the colored state to the achromatic state was 1.1 seconds. Also, the average time required for whole the screen to complete the color change was 1.3 seconds.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display comprising:
  a first substrate including
    a first insulating substrate with a first main surface,
    a first alignment layer covering the first main surface and defining an alignment direction parallel to the first main surface, an upstream side as one end's side of the alignment direction, and a downstream side as another end's side of the alignment direction, the first alignment layer tilting liquid crystal molecules toward the downstream side, and
    first electrodes interposed between the first insulating substrate and the first alignment layer and each comprising an upstream section that includes a first edge facing the upstream side and a downstream section that includes a second edge facing the downstream side and is provided with a first recess recessed relative to the second edge, the first recess forming on the downstream section a third edge extending in the alignment direction and a fourth edge extending downstream of the third edge in a direction crossing the alignment direction, the fourth edge connecting the third edge to the second edge and facing the upstream side;
  a second substrate including
    a second insulating substrate with a second main surface facing the first alignment layer,
    a second alignment layer covering the second main surface, and
    a second electrode interposed between the second insulating substrate and the second alignment layer; and
  an optical filter layer interposed between the first and second substrates and including liquid crystal molecules.

2. The display according to claim 1, wherein the upstream section further includes a protrusion protruding from the first edge toward the upstream side and including an edge that extends in the alignment direction.

3. The display according to claim 2, wherein the first recess is larger than the protrusion.

4. The display according to claim 3, wherein the protrusion of each of the first electrodes is partially located in the first recess of the adjacent first electrode.

5. The display according to claim 1, wherein the upstream section is provided with a second recess that is recessed relative to the first edge and includes an edge extending in the alignment direction.

6. The display according to claim 5, wherein the first recess is larger than the second recess.

7. The display according to claim 1, wherein each of the first electrodes has a shape of rectangle provided with the first recess on a long side thereof.

8. The display according to claim 1, wherein each of the first electrodes has a shape of quadrangle provided with the first recess on at least one of two adjacent sides thereof, each of the adjacent sides facing the downstream side.

9. A liquid crystal display comprising:
  a first substrate including
    a first insulating substrate with a first main surface,
    a first alignment layer covering the first main surface and defining an alignment direction parallel to the first main surface, an upstream side as one end's side of the alignment direction, and a downstream side as another end's side of the alignment direction, the first alignment layer tilting liquid crystal molecules toward the downstream side, and first electrodes interposed between the first insulating substrate and the first alignment layer and each comprising an upstream section that includes a first edge facing the upstream side and a downstream section that includes a second edge facing the downstream side and a first protrusion protruding from the second edge toward the downstream side, the first protrusion forming on the downstream section a third edge extending in the alignment direction and a fourth edge extending upstream of the third edge in a direction crossing the alignment direction, the fourth edge connecting the third edge to the second edge and facing the upstream side;

a second substrate including a second insulating substrate with a second main surface facing the first alignment layer, a second alignment layer covering the second main surface, and a second electrode interposed between the second insulating substrate and the second alignment layer; and an optical filter layer interposed between the first and second substrates and including liquid crystal molecules.

10. The display according to claim 9, wherein the upstream section is provided with a recess recessed relative to the first edge and includes an edge that extends in the alignment direction.

11. The display according to claim 10, wherein the first protrusion is larger than the recess.

12. The display according to claim 9, wherein the upstream section further includes a second protrusion protruding from the first edge toward the upstream side and including an edge that extending in the alignment direction.

13. The display according to claim 12, wherein the first protrusion is larger than the second protrusion.

14. The display according to claim 9, wherein each of the first electrodes has a shape of rectangular provided with the first protrusion on a long side thereof.

15. The display according to claim 9, each of the first electrodes has a shape of quadrangle provided with the first protrusion on at least one of two adjacent sides thereof, each of the adjacent sides facing the downstream side.

16. The display according to claim 1, wherein the fourth edge directly connects the third edge to the second edge.

17. The display according to claim 1, wherein the third and fourth edges form an obtuse angle.

18. The display according to claim 9, wherein the fourth edge directly connects the third edge to the second edge.

19. The display according to claim 9, wherein the third and fourth edges form an obtuse angle.

* * * * *

UNITED STATES PATENT AND TRADEMARK OFFICE
CERTIFICATE OF CORRECTION

| | | |
|---|---|---|
| PATENT NO. | : 7,746,437 B2 | Page 1 of 1 |
| APPLICATION NO. | : 12/027528 | |
| DATED | : June 29, 2010 | |
| INVENTOR(S) | : Kizu et al. | |

It is certified that error appears in the above-identified patent and that said Letters Patent is hereby corrected as shown below:

On the Title Page, Item 73

Add Second Assignee: Toshiba Matsushita Display Technology Co., Ltd.

Signed and Sealed this
Sixth Day of December, 2011

David J. Kappos
*Director of the United States Patent and Trademark Office*